United States Patent

Horne et al.

[11] Patent Number: 5,861,226
[45] Date of Patent: Jan. 19, 1999

[54] METHOD OF FABRICATING A RESONANT MICROMESH FILTER

[76] Inventors: William E. Horne, 14704 SE. 100th St., Renton, Wash. 98059; Mark D. Morgan, 7082 S. 220th St., Kent, Wash. 98032

[21] Appl. No.: 771,590

[22] Filed: Dec. 20, 1996

Related U.S. Application Data

[62] Division of Ser. No. 423,957, Apr. 18, 1995, Pat. No. 5,611,870.

[51] Int. Cl.$^6$ ........................................................ G03F 9/00
[52] U.S. Cl. .................................. 430/5; 216/24; 216/48; 216/62; 250/492.21; 250/492.22; 250/492.3; 430/5; 438/717; 136/257
[58] Field of Search ................................. 216/24, 48, 62; 438/717; 430/5; 136/257; 250/492.21, 492.22, 492.3

[56] References Cited

U.S. PATENT DOCUMENTS

| | | | |
|---|---|---|---|
| 4,757,208 | 7/1988 | McKenna et al. | 250/492.2 |
| 4,827,138 | 5/1989 | Randall | 250/492.2 R |
| 5,529,862 | 6/1996 | Randall | 430/5 |
| 5,567,551 | 10/1996 | Yahalom et al. | 430/56 |

*Primary Examiner*—R. Bruce Breneman
*Assistant Examiner*—Thomas W. Weingart
*Attorney, Agent, or Firm*—Delbert J. Barnard

[57] ABSTRACT

A method of fabricating a resonant micromesh filter having conductive antenna elements sized on the order of microns. The steps comprise of first creating an exposure mask having absorbing portions capable of stopping incident ions completely and transmitting portions incapable of stopping incident ions and through which incident ions can pass. The absorbing and transmitting portions form in the mask in the pattern of the antenna elements to be fabricated. Second, an exposure mask confronting an unpatterned filter is positioned. The unpatterned filter includes: a substrate, a thin metal foil mounted on the substrate, and a resist material covering the metal flow. Third, ions are passed through the exposure mask. The absorbing portions of the mask stop the ions and the transmitting portions allow the ions to pass through the mask and expose the section of the resist material of the filter in the pattern of the antenna elements. Fourth, the exposure mask is repositioned over an area of the unpatterned filter not previously exposed to incident ions. The third step is repeated. Then fourth step is repeated until a desired surface area of the unpatterned filter has been exposed. Last, the exposed unpatterned filter is processed to produce a conductive antenna array supported by a substrate.

8 Claims, 17 Drawing Sheets

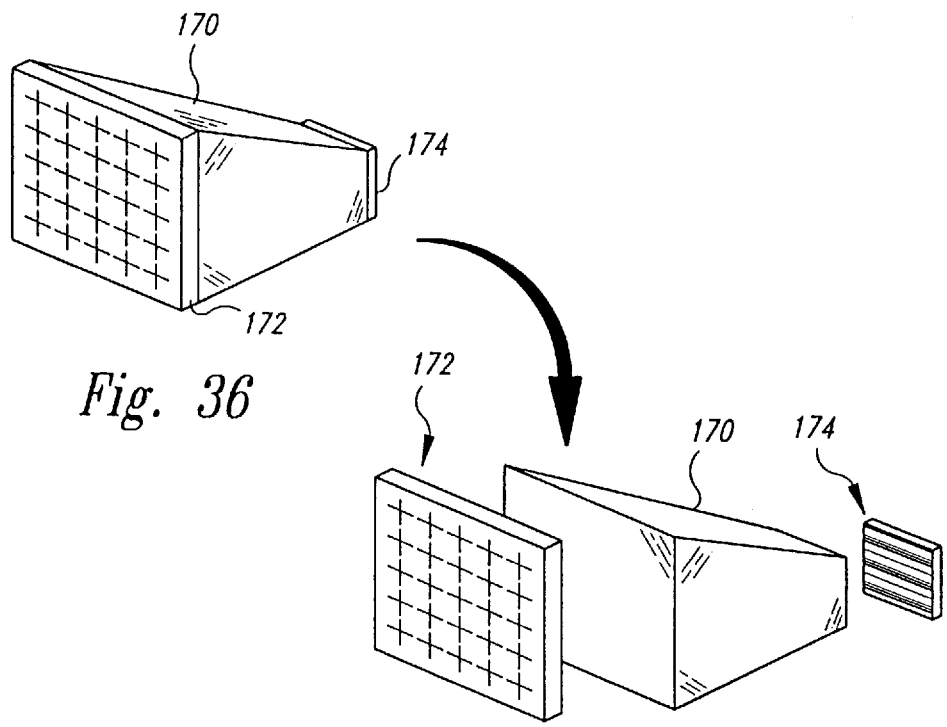
Fig. 36
Fig. 37
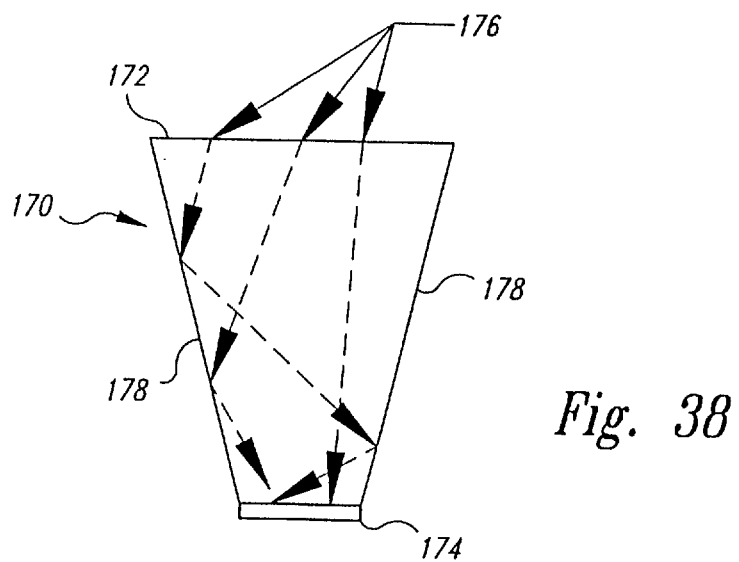
Fig. 38

METHOD OF FABRICATING A RESONANT MICROMESH FILTER

This application is a division of application Ser. No. 08/423,957, filed Apr. 18, 1995 now U.S. Pat. No. 5,611,870.

TECHNICAL FIELD

This invention pertains to a filter system for modifying the emitted radiant energy spectrum of a thermal energy source to a desired spectral bandwidth profile. More particularly, this invention pertains to a filter array of resonant conductive antenna elements, either capacitive or inductive, formed on a dielectric substrate to filter thermal radiation and, thereby, modify its radiant energy spectral profile.

BACKGROUND OF THE INVENTION

For many applications, it is desirable to have a thermal energy source whose emitted radiant energy consists of photons that are confined either to a single wavelength or to a narrow band of wavelengths. For example, photovoltaic cells have unique spectral responses and can be optimized to efficiently convert electromagnetic radiation to electricity if the incident radiation on the cells is constrained to those frequencies or wavelengths most efficiently utilized by the photovoltaic cells. A common way of achieving a desired radiant energy spectrum from a thermal energy source is to select a material whose atomic or molecular properties constrain its emittance to selected frequencies or wavelengths. Examples of such materials are some gases, such as cesium, and certain rare earth oxides, such as yterbium oxide. Rare earth oxides are used, for example, to modify the emitted radiant energy from the burner element of an oil-burning lamp.

Difficulties with using gases and oxides are due to the natural constraints on their properties, i.e., they are usually constrained to a wavelength determined by their physical characteristics, which wavelengths cannot be adjusted or modified to match other desired frequencies. In the case of gases, it is difficult to efficiently couple radiant energy into desired light-emitting modes, and in the case of rare earth oxides, it is difficult to suppress out-of-band background emittance to achieve a sufficiently broad bandwidth profile in order to achieve high efficiency coupling of energy into the desired modes. Further, both media are transparent to broadband radiation from background sources such as mechanical mounting structures.

SUMMARY OF THE INVENTION

Briefly described, the present invention is a system for modifying the radiant energy spectrum of a thermal energy source to produce a desired spectral bandwidth profile. The system includes a frequency-selective resonant micromesh filter that confronts the thermal energy source. The micromesh filter includes an array of resonant conductive antenna elements and a substrate for supporting the antenna elements. Thermal radiation emitted from the energy source is filtered by the micromesh filter whereby radiant energy at particular wavelengths is reflected back to the energy source, while certain wavelength photons are transmitted through the micromesh filter. The bandwidth profile of the transmitted radiant energy spectrum can be optimized by controlling the design characteristics of the micromesh filter.

One reason for optimizing the transmitted radiant energy spectrum is to match the energy spectrum with the energy response profile of a photovoltaic cell. When the bandwidth profile of the transmitted radiant energy matches the bandwidth response of the photovoltaic cell, the energy conversion efficiency of the cells is optimized. Thus, in one application for the present invention, photovoltaic cells are arranged to confront the thermal energy source and receive radiant energy transmitted by the micromesh filter so as to efficiently convert thermal energy to electricity by matching the spectral bandwidth of a thermal energy source to the response characteristics of the cell.

The resident conductive antenna elements of the micromesh filter can be in the form of slots, cross-slots, or tri-slots. Each of these antenna element configurations provides dual polarization. However, other designs providing dual polarization are acceptable and would work in the present invention.

The conductive antenna elements are formed by an ion beam lithography process, wherein ions are passed through a stencil and deposited onto a resist material mounted on a layer of conductive material. The stencil has a pattern corresponding to the pattern of the antenna array, i.e., slots, cross-slots, tri-slots. The exposed resist and conductive material are chemically developed to remove the resist and portions of the conductive material to produce a filter with an array of conductive antenna elements. The stencil is repositioned over the resist material for subsequently exposing the resist material.

The antenna elements can be either inductively resonant antenna elements or capacitively resonant antenna elements. In addition, a micromesh filter can be provided with both capacitive and inductive antenna elements. In this manner, the transmitted radiant energy spectrum can be further defined, such as by selecting capacitive antenna elements to produce a radiant energy spectrum with a bandwidth profile at a longer wavelength than the bandwidth profile produced by the inductive antenna elements. This combined inductive-capacitive micromesh filter, in combination with a photovoltaic cell, produces a bandwidth profile that is better matched to the cell response profile of the PV cells, thus reducing out-of-band losses.

In another application for the micromesh filter, a thermal energy source and the micromesh filter are confined within an elliptical cavity having a closed end and an open end. A reflective inner surface is provided in the elliptical cavity. The thermal energy source is positioned at the focal point of the elliptical cavity adjacent the closed end of the cavity, and the micromesh filter is positioned at the center of the elliptical cavity. A parabolic reflector is placed confronting the open end of the elliptical cavity. The focal point of the parabolic reflector is co-positioned with the focal point of the elliptical cavity adjacent the open end of the cavity. Thermal energy emitted by the thermal energy source is reflected off the inner surface of the elliptical cavity and is filtered by the micromesh filter. Radiant energy transmitted by the micromesh filter either reflects off of the inner surface of the elliptical cavity or escapes out the open end of the cavity. The escaping radiant energy reflects off the parabolic reflector in a unidirectional manner back past the elliptical cavity. This arrangement creates a unidirectional beam of radiant energy having a narrow spectral bandwidth profile. Preferably, the exterior surface of the thermal energy source includes dendritic structures for enhancing absorption of reflected energy.

In another application for the micromesh filter and photovoltaic cells, a thermophotovoltaic converter is provided, including a combustion chamber, a PV cell array, and a heat exchanger. Reactant air is introduced into the combustion chamber by first passing it past the PV cells to cool the cells and heat the reactant air, and then through a heat exchanger where the reactant air is further heated by the hot exhaust gases from the combustion chamber. This arrangement maintains the photovoltaic cell at a lower temperature, thereby improving its efficiency, and the reactant air is heated closer in temperature to combustion temperature, thereby improving combustion efficiency.

These and other objects, advantages, and features of the present invention will be apparent from the following description of the best mode of the invention, when read in conjunction with the claims and the figures, all of which are incorporated herein as part of the disclosure of the invention.

BRIEF DESCRIPTION OF THE DRAWINGS

Like reference numerals are used to indicate like parts throughout the various figures of the drawing, wherein:

FIG. 36 is a pictorial view of a modified micromesh filter-PV cell application, wherein a silicon prism is positioned between the micromesh filter and the PV cell;

FIG. 37 is an exploded view of FIG. 36;

FIG. 38 is a schematic view illustrating the path of travel of incident photons on the micromesh filter-silicon prism-photovoltaic cell of FIG. 36;

BEST MODE FOR CARRYING OUT THE INVENTION

Figure 1:
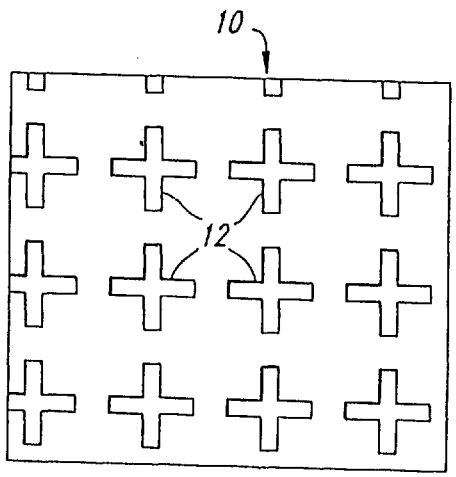
FIGS. 1–4 are substantially enlarged front views of four different arrangements for the antenna elements of the micromesh filter of the present invention.

Referring now to the drawings, FIGS. 1–4 are substantially enlarged views showing various embodiments for conductive antenna array patterns for submicron size resonant filters. In FIG. 1, a cross-slot conductive antenna array pattern 10 is shown. Antenna array pattern 10 includes an array of antenna elements 12 in the form of crosses. The crosses 12 are referred to as "cross-slots." Cross-slots 12 are sized on the order of microns, for example, 1–2 microns in length, and are arranged in a square or grid-like pattern formed in a layer of conductive material such as a thin metal film. The process for forming cross-slots 12 is discussed later.

Figure 2:
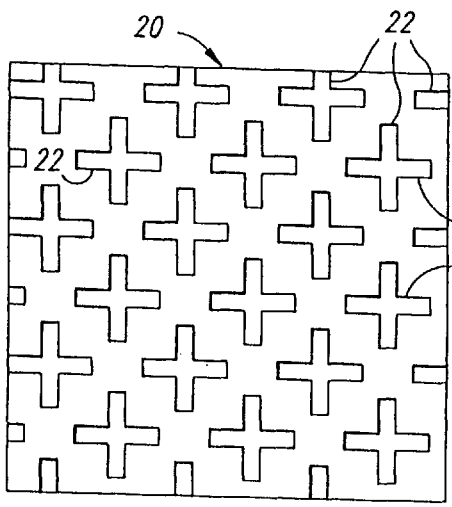

FIG. 2 is a modified cross-slot conductive antenna array pattern 20 including an array of antenna elements or cross-slots 22 similar in shape to the cross-slots 12 of FIG. 1. Antenna elements 22 are arranged in a face-centered pattern wherein an additional cross-slot 22' is positioned at the center of four cross-slots 22 that form a square pattern. The face-centered pattern has the effect of increasing the filter's transmission profile, as discussed later.

Figure 3:
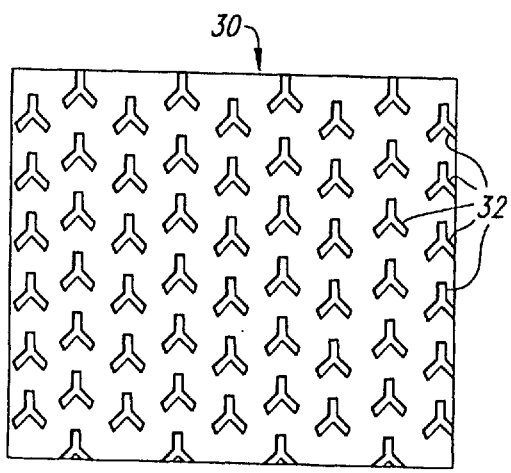

FIG. 3 is a third embodiment for a conductive antenna array pattern 30 comprising tri-slot antenna elements 32. Like the antenna elements of FIG. 2, tri-slot slots 32 are formed in a conductive metal film and are arranged in a hexagonal pattern. A square pattern of tri-slots could also be employed, as well as other patterns.

Figure 4:
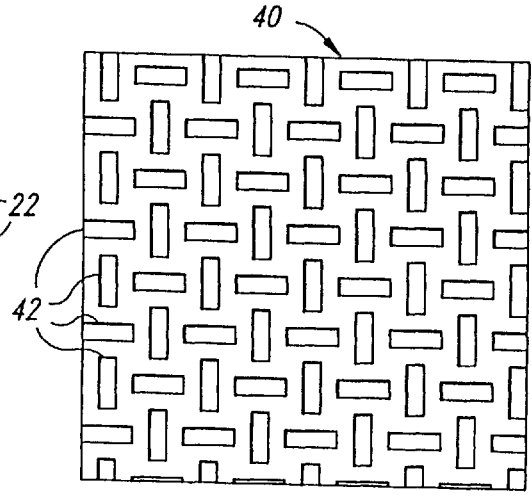

FIG. 4 illustrates a fourth embodiment for a conductive antenna array 40. Antenna array 40 includes an array of individual slots 42 formed in a metal film. Alternating slots 42 are aligned 90° relative to one another to provide dual polarization, as is achieved with the cross-slot and tri-slot patterns.

Figure 5:
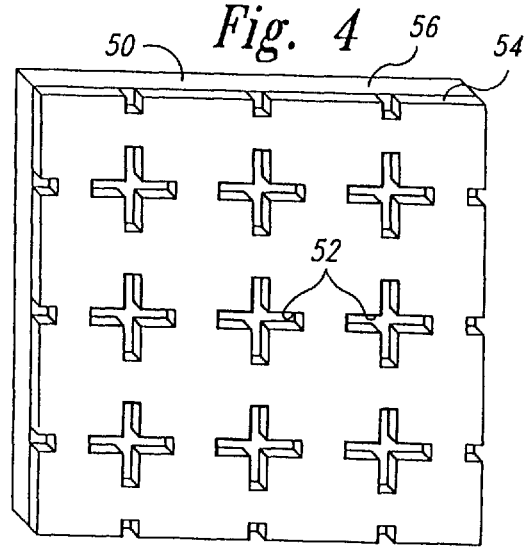
FIG. 5 is a pictorial view of an inductively-resonant micromesh filter.

FIG. 5 illustrates a micromesh filter 50. Filter 50 includes the conductive antenna array pattern 10 of FIG. 1. The antenna elements 52 are formed as cross-slots in a conductive metal film 54. Preferably, conductive metal film 54 has properties of low electrical resistance, low broadband spectral emittance and high reflectivity. Gold is a suitable material for the metal film. Gold has a melting point of 1064° C., and resistivity of 2.24 $\mu\Omega$-cm at 20° C. Another suitable material is rhodium, which has a melting point of 2233° K., a resistivity of 8×10$^{-6}$ ohm-cm at 1600° K., and a broadband spectral emittance of about 0.1 over a broad range about the center frequency of the antenna array.

This type of an array is known as an inductively-resonant array. The inductive array is supported by a dielectric medium that functions as a substrate 56. Preferably, substrate 56 is transparent to wavelengths within the bandwidth in which filter 50 is designed to modify emitted radiant energy. Silicon and sapphire are suitable materials because they are transparent to wavelengths up to approximately 5 microns. Accordingly, for many filter array applications, these materials are transparent to a wideband of wavelengths about the center frequency of the filter arrays. The optical and electrical properties of the substrate dielectric medium significantly affect the performance of the antenna array because the substrate introduces shunt capacitance and resistance between the array elements.

Figure 6:
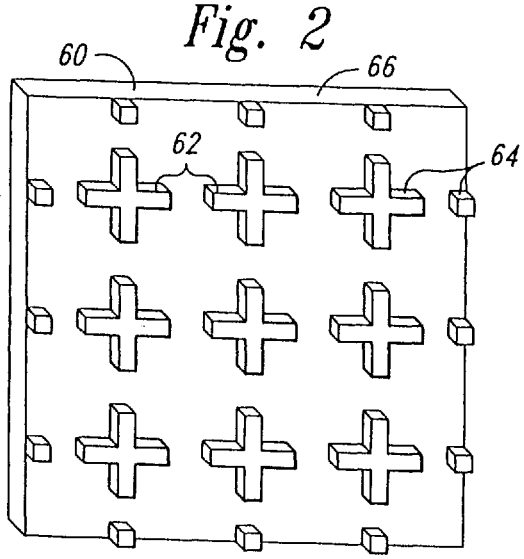
FIG. 6 is a pictorial view of a capacitively-resonant micromesh filter.

FIG. 6 illustrates a capacitively-resonant micromesh filter 60. The capacitive resonant filter 60 includes cross-slot antenna elements 62 in the form of ridges, rather than slots, formed from a layer of conductive material 64. The cross-slot ridges 62 are analogous to the cross-slot antenna elements of FIG. 5 and, similarly, are arranged in a square pattern and are supported on a dielectric substrate 66.

Figure 7:
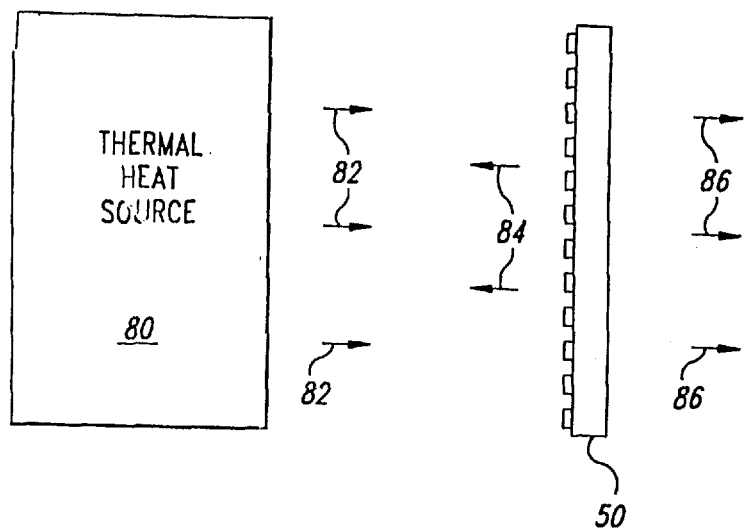
FIG. 7 is a schematic view of a thermal heat source and an adjacent micromesh filter, such as the filters disclosed in FIGS. 1–6, wherein the filter confronts the thermal energy source and alters the radiant energy spectrum of the energy transmitted through the filter.

FIG. 7 illustrates schematically the basic concept of the present invention. A thermal heat source 80 radiates energy, depicted as arrows 82, toward a micromesh filter 50, either a capacitive or inductive filter. Thermal heat source 80 may, for example, be gas-fired, solar, radioisotopes, nuclear, or a combination or hybrid design such as gas/solar. The present invention, in its broadest sense, is not intended to be limited to any particular type of energy source. The emitted radiant energy from heat source 80 is incoherent; for purposes of illustration, only the radiated energy incident upon micromesh filter 50 is shown. Micromesh filter 50 reflects some of the incident radiant energy, as depicted by arrows 84, and transmits the rest of the radiant energy, as depicted by arrows 86. It should be noted that a small portion of the radiant energy is absorbed by filter 50. A gold film filter absorbs approximately 1–2% of the radiant energy. By configuring the design of filter 50 appropriately, a desired transmitted energy spectrum 86 can be produced. This is the basic concept of the present invention.

Figure 8:
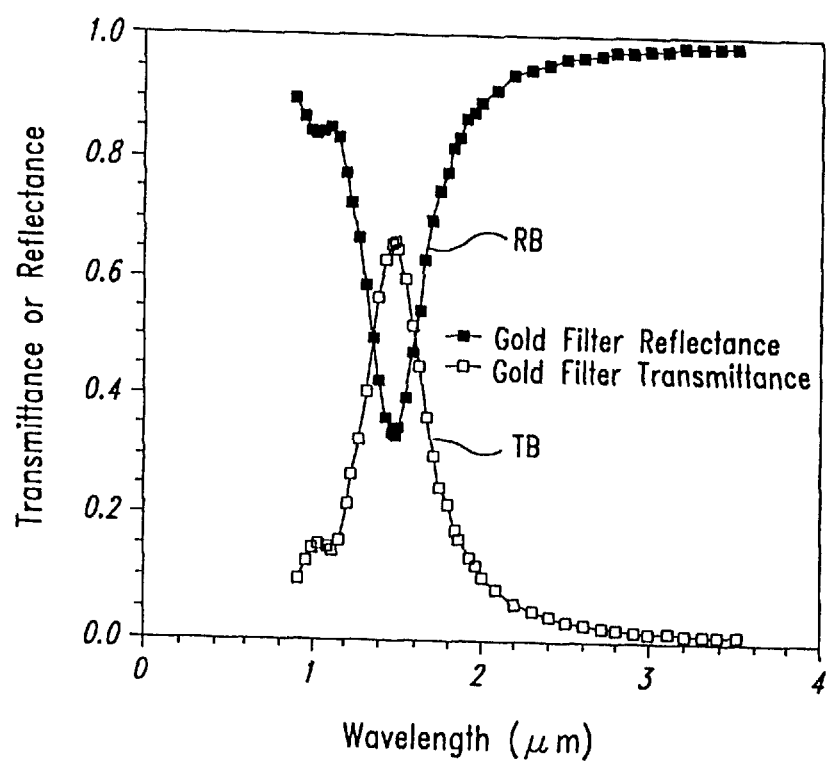
FIG. 8 is a chart illustrating the reflectance and transmittance radiant energy spectrums, or spectral bandwidth profiles, of an inductively-resonant micromesh filter.

FIG. 8 illustrates the transmittance and reflectance bands of an inductive-resonant gold micromesh filter. The transmittance band is indicated at TB and corresponds to radiant energy 86 shown in FIG. 7. The reflectance band is indicated at RB and corresponds to radiant energy 84, as shown in FIG. 7. As can be seen, at wavelengths shorter than approximately 1.0 micron, greater than 90% of the incident radiant energy is reflected back to the source. Beyond approximately 3.3–3.5 microns, greater than 97% of the radiant energy is reflected. Within this bandwidth, a substantial portion of the radiant energy is transmitted by filter 50.

The transmission of the antenna arrays, as represented by the y-axis in FIG. 8, is a percent transmission of the incident photon energy at a particular wavelength. The photons not transmitted are primarily reflected back to the source, while a small percentage is absorbed by the metal film of the filter. Because a gold film absorbs as little as 2% of the incident energy out past 0.6 microns, the reflectance band of the micromesh filters generally is a "reflection" of the transmittance band. For a capacitively-resonant filter, the transmittance and reflectance bands would be reversed.

The resonant wavelength of the transmittance band (or reflectance band) corresponds to the peak (or trough) of each energy spectrum profile. For example, the resonant wavelength of micromesh filter 50, as represented in FIG. 8, is approximately 1.5 microns. The "bandwidth" of a transmittance band is a representation of the width of the dome-shape portion of the transmission spectrum curve.

Figure 9:
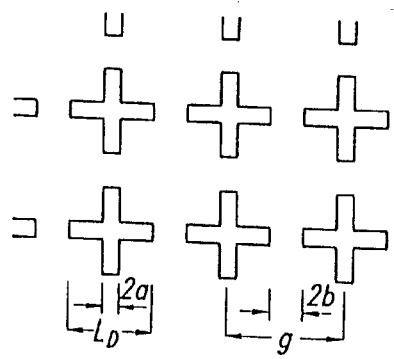
FIG. 9 is a substantially enlarged, simplified front view of a cross-slot antenna element pattern.
Figure 10:
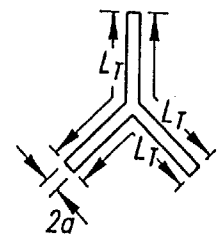
FIG. 10 is a substantially enlarged illustration of a tri-slot antenna element.

For a given substrate, the resonant wavelength or center frequency of the transmittance band can be adjusted according to the parameters L, a, and b, which dimensions are shown in FIGS. 9–10 for a cross-slot and tri-slot antenna element, respectively. $L_D$ is the length of one of the slots of the cross-slots; $L_T$ is twice the length of one of the legs of a tri-slot; $2a$ is the width of the antenna element; and $2b$ is the spacing between elements. In general, for low index of refraction materials, the resonant wavelength is approximately 2L and the bandwidth decreases as the ratio b/a increases. However, the resonant wavelength can also be strongly affected by the index of refraction (or dielectric constant) of the substrate. See Chase, S. T. and Joseph, R. D., "Resonant Array Bandpass Filters to the Far Infrared," *Applied Optics*, Vol. 22, No. 11, June 1983, pages 1775–1779.

For an isolated slot, a relationship exists between the center frequency or resonant wavelength, the slot dimensions, and the refractive index of the substrate. For example, the cross-slot length, $L_D$, is related to the resonant wavelength $\lambda_0$ and the indices of the media on either side of the cross-slots by the first order equation:

$$\lambda_0 = 2L_d[(n_1^2 + n_2^2)/2]^{1/2} \tag{1}$$

where $n_1$ and $n_2$ are the refractive indices of the media on each side of the array. The refractive indices are derived from the dielectric constant according to the equation:

$$\epsilon/\epsilon_0 = (n - ik)^2 \tag{2}$$

where: $\epsilon$ is the dielectric constant, $\epsilon_0$ is the permativity of free space, n is the refractive index, and k is the extinction coefficient. When the absorption length is short, k is usually numerically small compared to n, so an acceptable approximation becomes $\epsilon/\epsilon_0 = n^2$.

The addition of a fifth cross-slot to a "square" antenna array, to create a "face-centered" antenna array, as shown in FIG. 2, has the effect of increasing the peak transmittance over that of a square array. In general, any pattern geometry that increases the density of elements per unit area increases the peak transmittance.

The first order approximation of the resonant wavelength $\lambda_0$ for the slot arrangement of FIG. 4 is the same as that for the cross-slot arrangement of FIG. 1. For tri-slots, the first order approximation of the resonant wavelength is the following equation:

$$\lambda_0 = 1.82 L_T [(n_1^2 + n_2^2)/2]^{1/2} \quad (3)$$

For a given antenna element length and indices of refraction, a tri-slot array produces an emittance band that has a smaller resonant wavelength than that of a cross-slot array.

The resonant wavelength can be tuned to a desired value by varying either L, the indices of the media on either side of the arrays, or by choosing a particular array design. Thus, the dimensions and material properties of the surfaces and substrates and the array design must be carefully chosen for a particular application.

Figure 11:
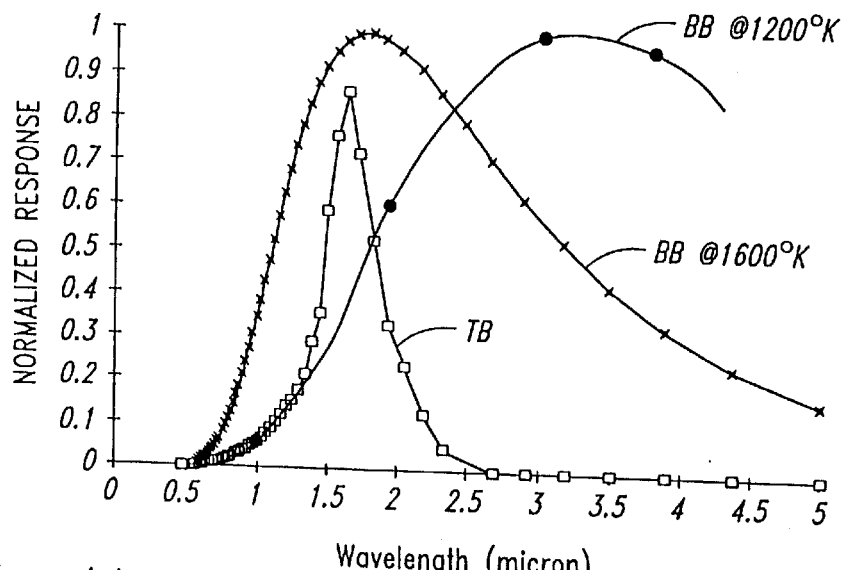
FIG. 11 is a chart illustrating the radiant energy spectrum for a black body (BB) thermal energy source at 1200° K. and 1600° K. and the transmittance band (TB) or radiant energy spectrum of an inductively-resonant micromesh filter.

FIG. 11 illustrates the relationship between the radiant energy spectrum of a black body BB and the transmittance band TB of an inductively-resonant micromesh filter. The radiant energy response of the black body is temperature dependent, as is shown by the different radiant energy spectra for a 1200° K. and a 1600° K. black body. In order to transmit a maximum amount of radiant energy within the bandwidth of a particular inductive micromesh filter, it is necessary to maintain the thermal energy source at a particular temperature. A greater proportion of the energy emitted by the 1600° K. heat source is transmitted by a filter with transmittance band TB. A combination of a 1600° K. black body emitter and the micromesh filter having transmittance band TB would produce improved bandwidth efficiency in filter performance than the same filter and a 1200° K. emitter. Accordingly, for certain applications, it is necessary to maintain the thermal energy source at a maximum temperature in order to optimize the spectral behavior of a micromesh filter.

It should also be noted that a capacitive filter can be used in combination with a black body emitter. The capacitive filter can be selected so that its suppression bandwidth, i.e., the radiant energy reflected back to source, corresponds to the emittance bandwidth of the energy source. In this manner, a substantial portion of the emitted radiant energy is efficiently reflected back to the BB emitter, with the transmitted energy suppressed at selected wavelengths.

Figure 12:
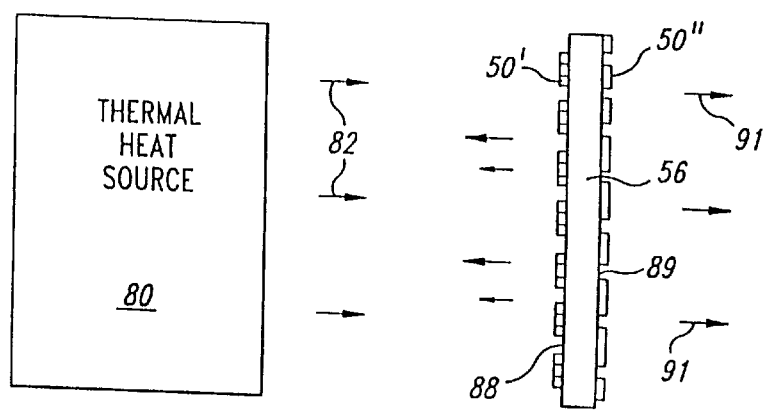
FIG. 12 is a schematic view of a thermal heat source and adjacent micromesh filter that includes both inductive and capacitive antenna elements.

It is also possible to provide a micromesh filter having two resonant filter arrays. As shown in FIG. 12, a first inductively-resonant filter array 50' covers the surface 88 of a dielectric substrate 56 confronting a thermal heat source 80. A second capacitively-resonant filter array 50" covers the opposite surface 89 of the substrate 56. The radiant energy 82 from the heat source 80 is filtered by the first array 50' and then by the second array 50", producing transmitted radiant energy 91.

Figure 13:
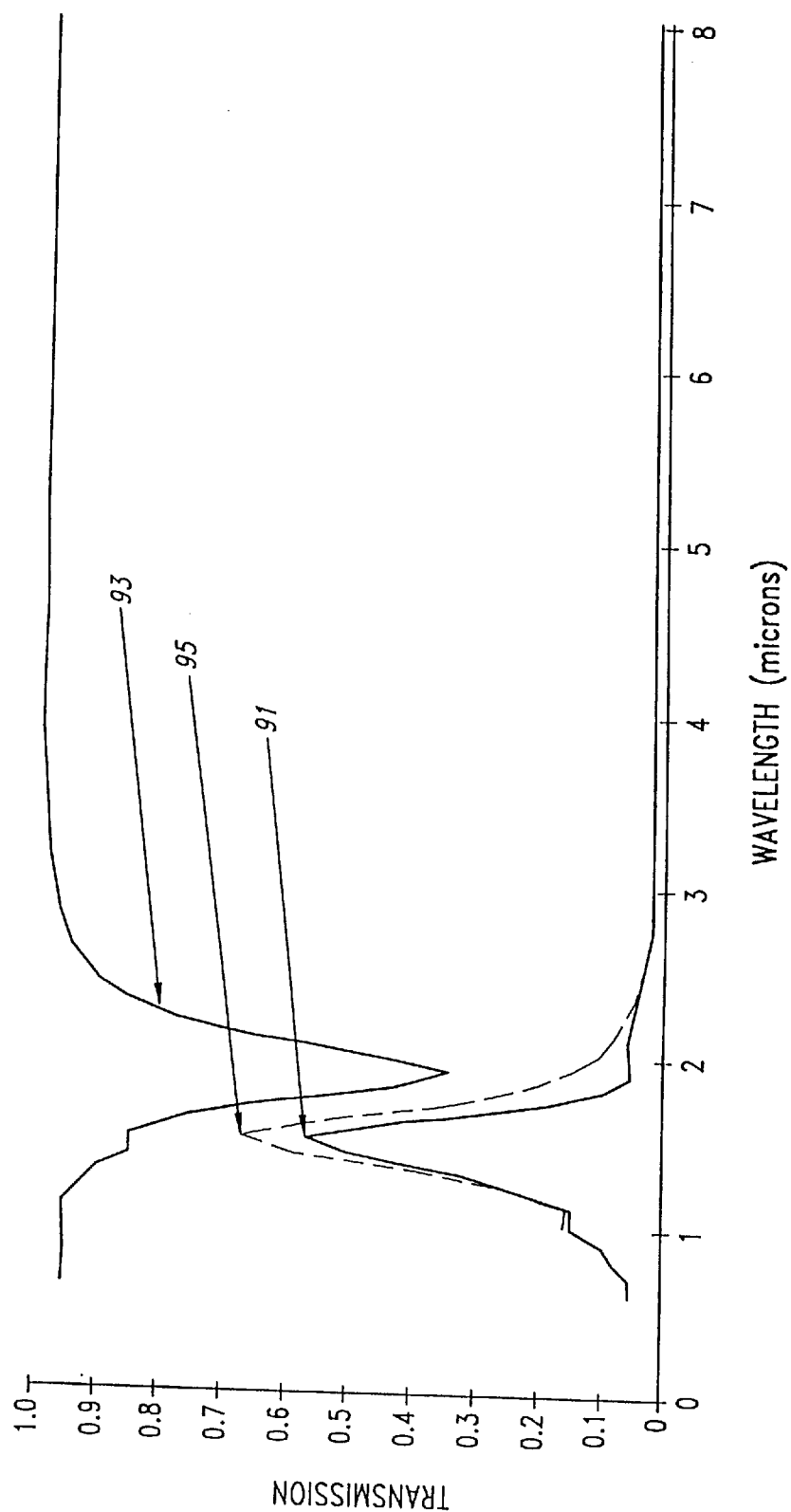
FIG. 13 is a chart illustrating the enhanced performance of a micromesh filter having a first and second filter, with the first filter having capacitively-resonant antenna elements, and the second filter having inductively-resonant antenna elements, like the filter array of FIG. 12.

The first filter 50' can be designed to have a longer resonant wavelength than the second filter 50". FIG. 13 illustrates a potential resultant radiant energy spectrum transmitted by the dual micromesh filter of FIG. 12. The resultant transmittance curve 91 is the product of the first filter and second filter transmittance curves 93, 95, respectively. The resultant transmitted radiant energy spectrum 91, thus, is suppressed at longer wavelength transmissions to create a better defined bandwidth profile. An application for a dual antenna arrangement is discussed later.

Figure 14:
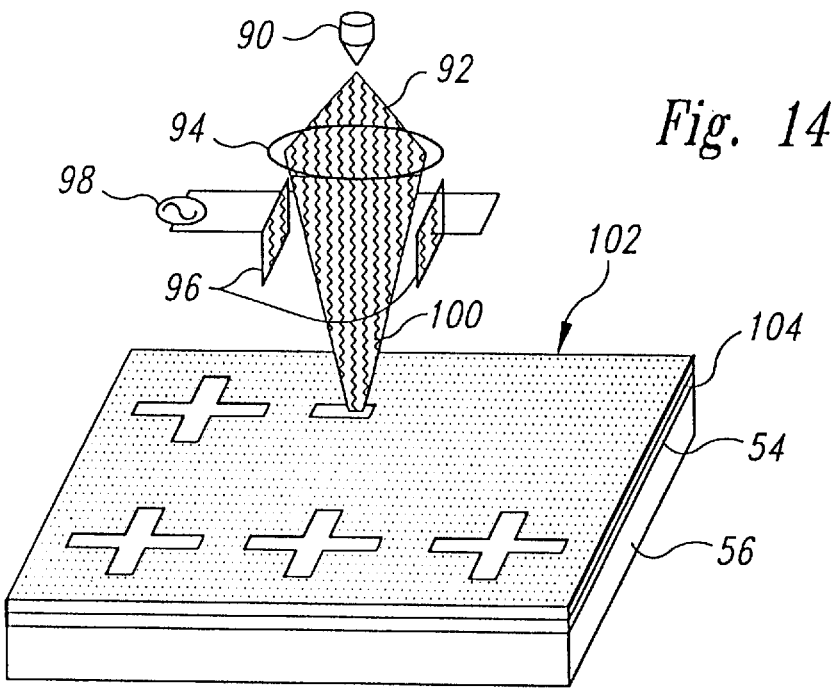
FIG. 14 is a pictorial view illustrating the method for fabricating a micromesh filter using electron beam lithography fabrication.

FIGS. 14–27 illustrate two methods for fabricating the micromesh filters of FIGS. 1–6. In FIG. 14, an electron beam lithography fabrication process is illustrated. Electron beam lithography is a process generally known in the art and used extensively in the manufacture of integrated circuits. In general, an electron source 90 generates a spray of electrons 92, which are redirected and focused by a group of lenses 94. Deflection plates 96 operatively connected to a control circuit 98 function to deflect the focused electron beam 100 across an unpatterned filter 102 to create a desired antenna pattern. The unpatterned filter 102 comprises a dielectric substrate 56, a metal film, and a polymer resist material 104. Resist material 104 is spun on the metal film 54 to the desired thickness. The resist material 104 can be any conventional positive resist material, such as polymethylmethacrylate (PMMA) or polystyrene (PS). A negative resist material would be used to fabricate a capacitive filter.

Figure 15:
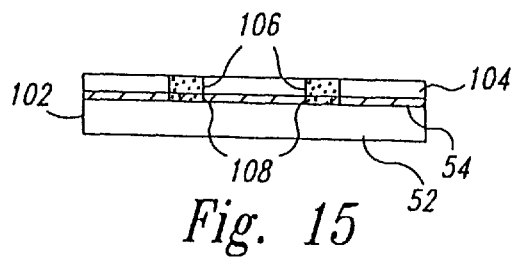
FIGS. 15–18 schematically illustrate the intermediate steps in producing a micromesh filter using electron beam lithography.
Figure 16:
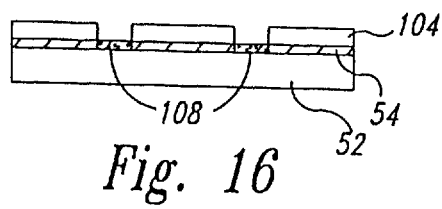
Figure 17:
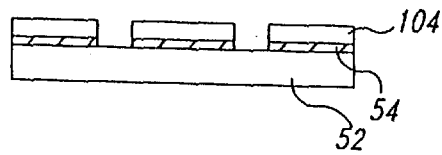
Figure 18:
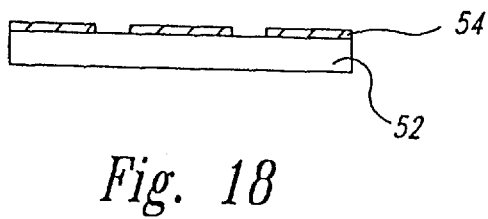

The focused incident beam of electrons 100, controlled by deflection plates 96 and circuit 98, creates a latent image pattern within the resist material. The incident electrons expose the resist material 104 in the desired pattern for subsequent etching. FIG. 15 shows a section 106 of the resist material 104 and a section 108 of the metal film 54 that are exposed to electrons. The exposed portion 106 of the resist is processed by chemically developing the resist material using standard resist developers. As shown in FIG. 16, developing removes electron-exposed positive resist material 106. Next, an ion-milling or ion etch process, using, for example, argon ions, removes exposed portion 108 of the metal film 54, as shown in FIG. 17. Finally, as shown in FIG. 18, the remaining resist material 104 is stripped using an organic solvent, such as acetone, which removes the resist material, while leaving the metal film 54 and substrate 52 intact.

While the E-beam lithography process is effective in fabricating a micromesh filter, the process is relatively time consuming and expensive. A more desirable process that replicates E-beam-generated antenna patterns is masked ion-beam lithography. The technique is based on area-selective transmission of light ions through thin foils or masks. Incident ions in the 50 kev–2 MeV range typically are stopped by foil thicknesses on the order of microns. A foil membrane with a pattern of solid and open areas can be used as an exposure mask. The open areas allow through passage of the ion particles, while the solid areas are able to stop the ions completely. Ions passing through the mask can then expose conventional resist materials, such as PMMA.

Figure 19:
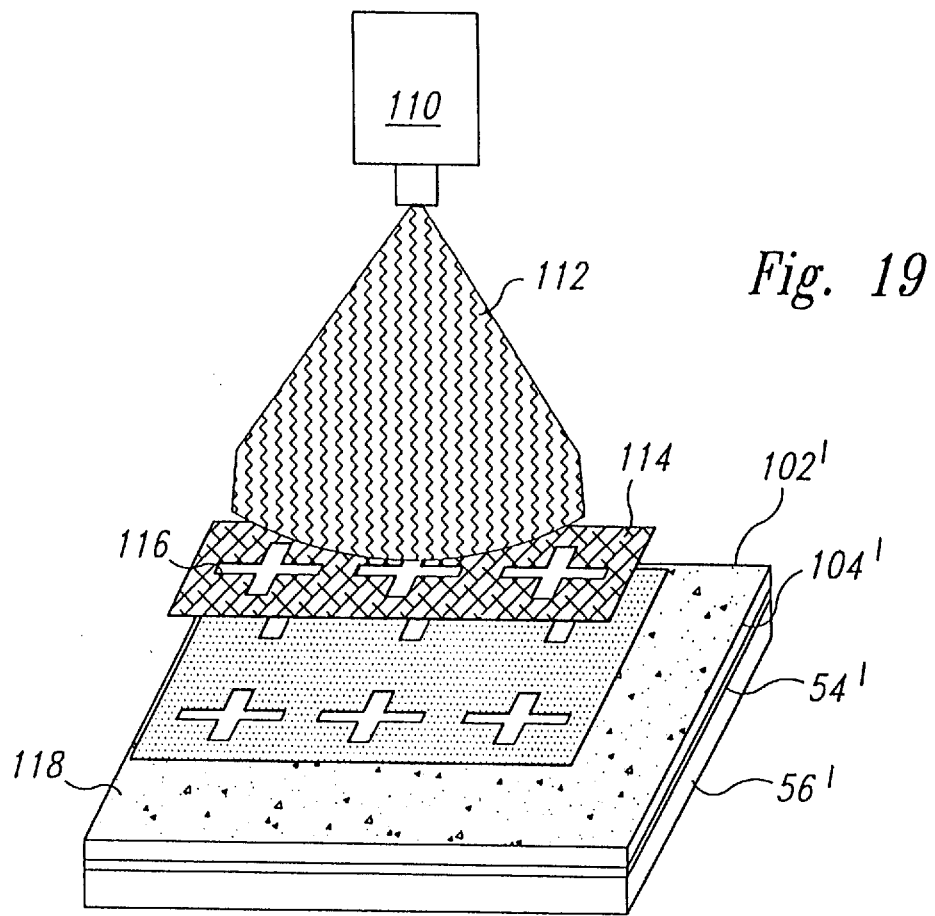
FIG. 19 is a pictorial view illustrating a method for producing a micromesh filter using ion-beam lithography.

An article entitled, "Fabrication of Low-Stress Silicon Stencil Masks for Ion Beam Lithography," by Sudipto Sen et al, J. Vac. Sci. Technol., B7(6), Nov/Dec 1989, pages 1802–1804, details a process for stencil mask fabrication. Generally, as shown in FIG. 19, a source 110 of hydrogen ions H+ generates a hydrogen ion spray 112 that strikes a stencil mask 114 positioned above an unpatterned micromesh filter 102'. The stencil mask 114 is created in the pattern of the antenna array to be fabricated on the filter 102'. As shown in FIG. 19, cross-slots 116 are created in the stencil mask 114. A portion of the ion spray 112 passes through slots 116 and exposes the resist 104' and metal film 54'. Ions that strike the stencil mask 114 are captured therein. After an area of the filter 102' has been exposed, the stencil mask 114 is repositioned over an unexposed portion 118 of the filter 102' or the substrate with filter blank is stepped under the stencil mask, and the exposure process is repeated. This step-and-repeat exposure process is continued until the entire filter 102' is exposed. Once the filter 102' is exposed, it can be chemically developed, as would a filter exposed by E-beam lithography.

Figure 20:
FIGS. 20–27 illustrate the intermediate steps in producing a micromesh filter by ion beam lithography.
Figure 21:
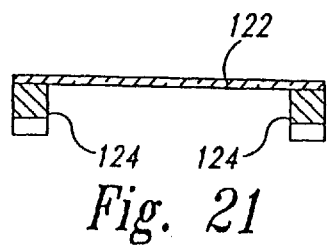
Figure 22:
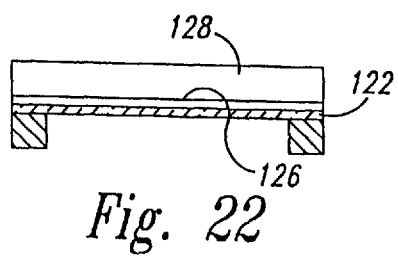

FIGS. 20–27 illustrate a process for fabricating the stencil mask 114. As shown in FIG. 20, a silicon wafer 120 has boron ions deposited therein to a desired depth, as indicated by portion 122. The depth can be selectively controlled, and should be approximately 1 micron. A reactive ion etch solution is used, as shown in FIG. 21, to remove the non-boron impregnated silicon from the thin layer of boron/ silicon, except for the end portions of the silicon wafer 120, which serve as supports 124 for the thin silicon membrane 122. A useful masking material, silicon dioxide ($SiO_2$) 126, is RF sputtered onto the silicon membrane 122, and a PMMA resist material 128 is spun on the $SiO_2$ layer, as shown in FIG. 22. The $SiO_2$ layer has a depth on the order of 500–800 Å, and the resist material has a depth on the order of 1600–2000 Å. E-beam lithography is then used to write the desired antenna pattern in the stencil mask.

Figure 23:
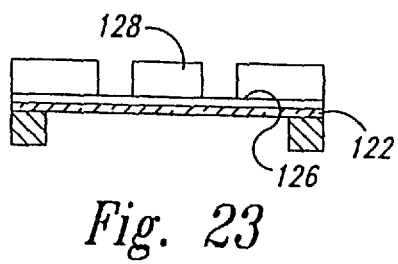
Figure 24:
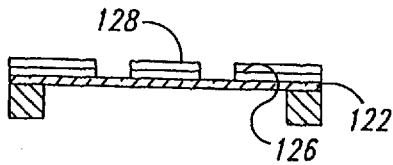
Figure 25:
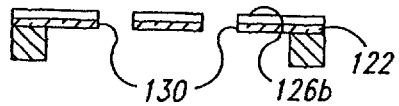

As shown in FIG. 23, after the stencil mask is exposed to hydrogen ions, the exposed resist material 128 is developed, removing only exposed portions of the PMMA. As shown in FIG. 24, a reactive ion etch is applied to remove the exposed $SiO_2$; and another reactive ion etch is applied to remove the exposed silicon 122 to form the stencil mask 114, shown in FIG. 25. The stencil mask includes slots 130, which form an inductive antenna array pattern in the mask.

Figure 26:
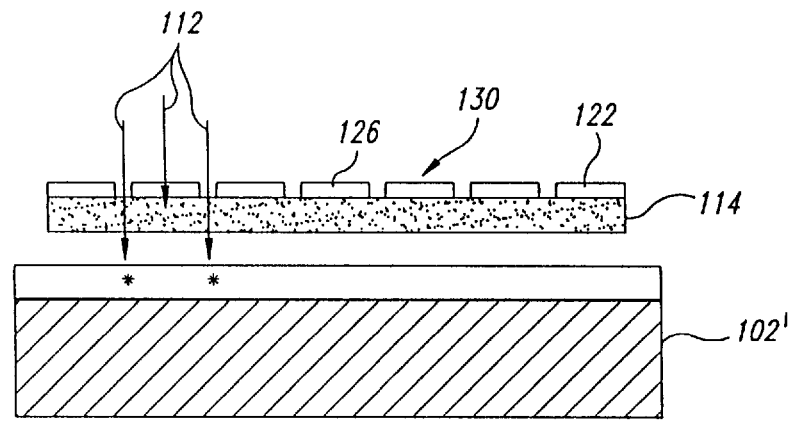

As shown in FIG. 26, after the stencil mask 114 is fabricated, it is positioned over the unpatterned filter 102' and an ion spray 112 is directed through the stencil mask 114. The silicon membrane 122 and $SiO_2$ 126 are thick enough to stop the incident ions completely, while incident ions that pass through the slots 130 of the stencil mask 114 expose the unpatterned filter 102' below.

Figure 27:
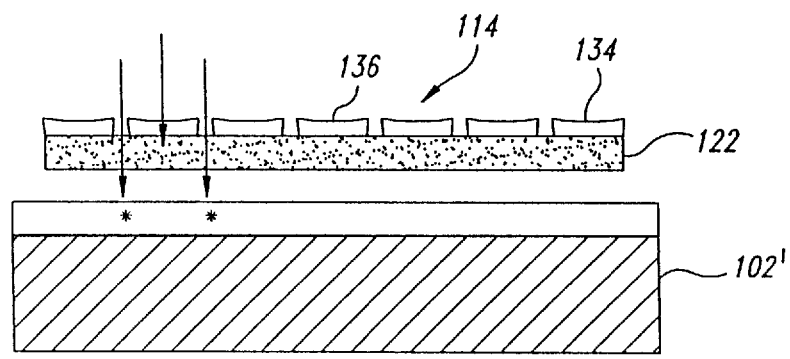

FIG. 27 illustrates an alternative method for fabricating the stencil mask 114. Instead of applying a silicon dioxide material to the silicon membrane 122 between the membrane and a resist, a thin metal layer 134 is applied to the silicon membrane 122. Nickel or molybdenum are suitable metals for forming the thin metal layer 134. After the stencil mask 114 is exposed, the resist material is removed by etching, and the exposed portions of the metal layer 134 are removed by ion milling to form a patterned metal absorber 136. Using a patterned metal absorber 136 in conjunction with the silicon membrane 122 allows the membrane 122 to be somewhat thicker, perhaps a micron or more, and support a metal layer of comparable thickness. Masks made by this process are more rugged than stencil masks formed by the process illustrated in FIGS. 20–25. However, a disadvantage with this process is the need to align the incident ion beam in the filter exposure process with the silicon crystal axis of the silicon membrane 122 in order to enhance ion transmission by channeling.

In general, the E-beam lithography process can write a pattern 1 cm$^2$ in approximately 12 hours. Masked ion-beam lithography can replicate 1 cm$^2$ in approximately 5 seconds.

Figure 28:
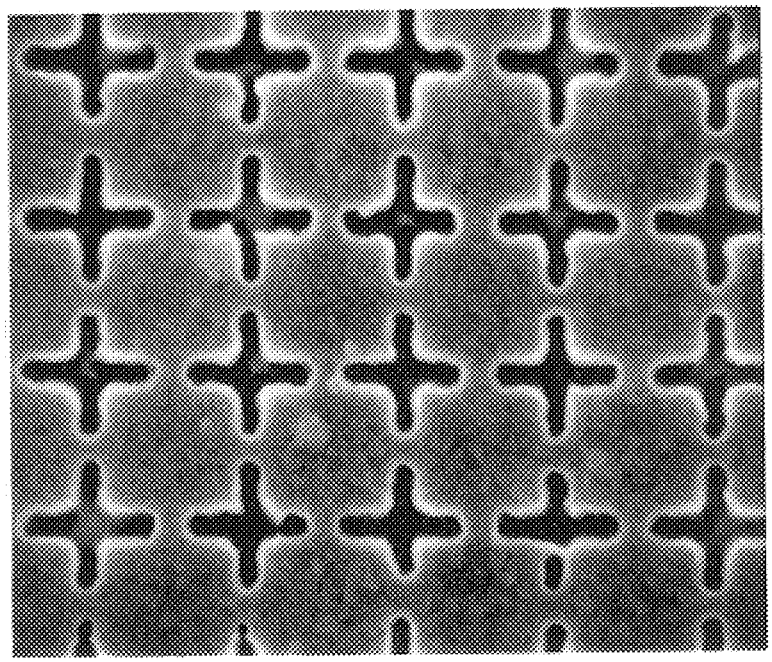
FIGS. 28–29 are enlarged photographs of micromesh filters fabricated using ion beam lithography.
Figure 29:
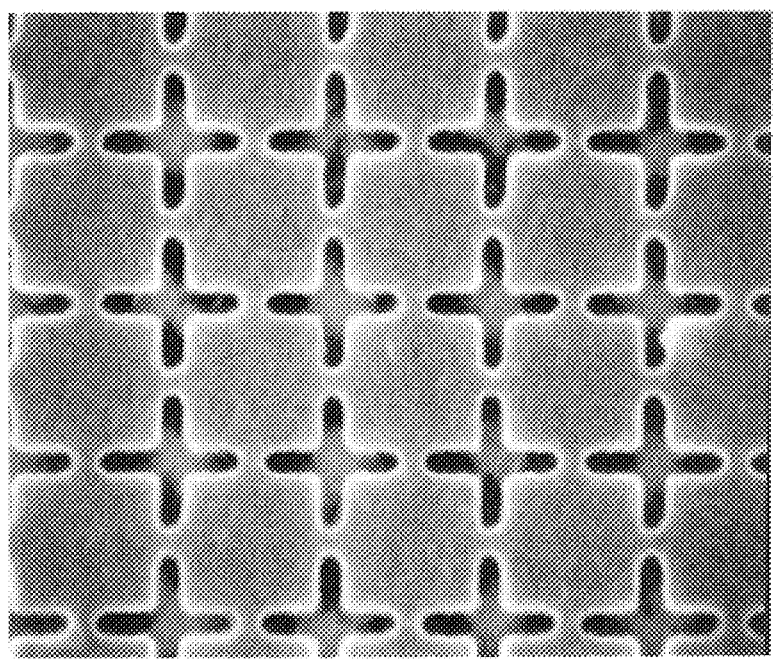

FIGS. 28 and 29 show actual filters fabricated using ion beam lithography.

Figure 30:
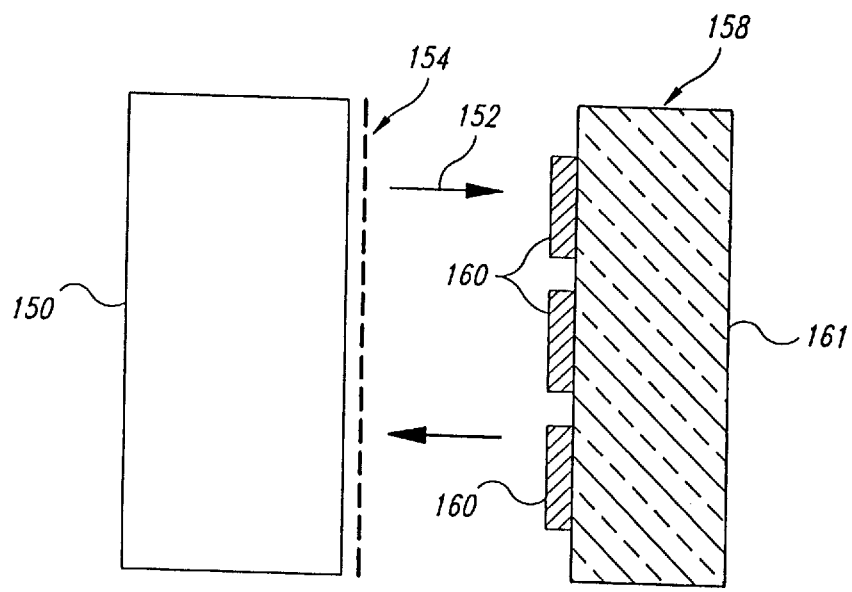
FIG. 30 is a schematic illustration of a combination micromesh filter and photovoltaic cell application.

FIG. 30 illustrates a thermophotovoltaic application for a conductive filter array. Thermophotovoltaic energy conversion is a process whereby radiant energy from an incandescent emitter is converted to electrical power by a photovoltaic cell (PV cell), with long-wavelength photons being reflected back to the radiant source. An incoherent thermal energy source 150 emits thermal energy, as depicted by arrows 152, which energy is filtered by micromesh filter 154. The thermal energy 152 transmitted by filter 154 strikes a photovoltaic cell assembly 158. Energy not transmitted by filter 154 is reflected back to source 150. Cell assembly 158 includes photovoltaic cells 160 and a ceramic substrate 161. Substrate 161 should be kept as cool as possible in order to increase conversion efficiency.

Micromesh filter 154 should be chosen to constrain emitted radiant energy 152 from heat source 150 to wavelengths that can most effectively be converted to electricity by photovoltaic cell assembly 158. For a gallium-antimony (GaSb) photovoltaic cell having a bandgap energy of about 0.7 eV, photons having wavelengths between 1.0 and 1.80 microns are converted to electricity most efficiently. Thus, an inductively resonant antenna array having a center frequency or resonant wavelength at 1.625 micron would present to photovoltaic cells 160 an energy spectrum that can be utilized most efficiently by the cells.

In order to tune the filter emittance to a resonant wavelength of 1.625 microns, the length (L) of the slots should be about 0.570 micron. (See equation (1), $n_2=1.74$). The width of the slots should be as narrow as possible, i.e. about 0.05 micron. The characteristics of the photovoltaic cells are chosen so that they absorb photons whose energy is equal to or greater than their bandgap energy, while reflecting lower energy (longer wavelength) photons.

Figures 31, 32:
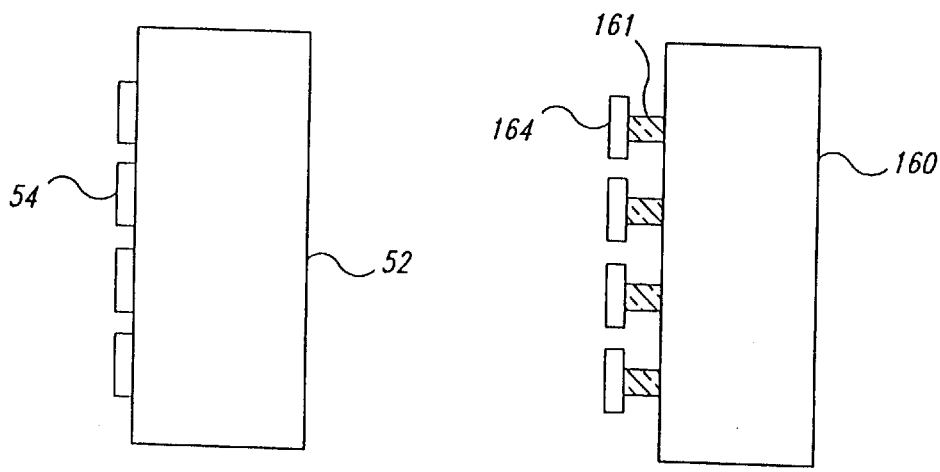
FIG. 31 is a schematic illustration of a micromesh filter formed on a substrate.
FIG. 32 is a schematic illustration of a free-standing micromesh filter.
Figure 33A:
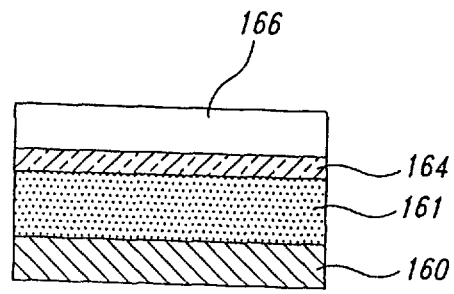
FIGS. 33(A)–33(D) illustrate the intermediate steps in forming a free-standing mesh array.
Figure 33B:
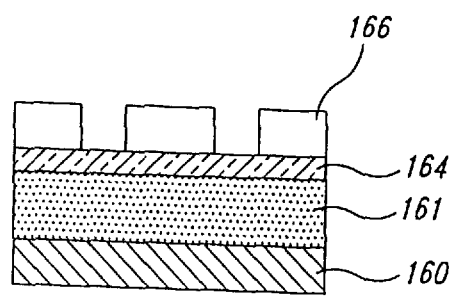
Figure 33C:
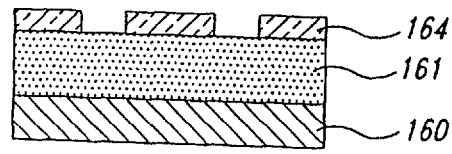
Figure 33D:
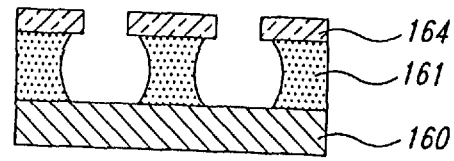

For a resonant wavelength of 1.625 micron, the index of refraction of the filter substrate should be as low as possible. The lowest possible index value would be a free-standing mesh array. FIG. 31 illustrates a typical configuration wherein the metal film 54 directly contacts the substrate 52. FIG. 32 illustrates a nearly free-standing mesh array. The fabrication process for a free-standing array begins with the deposition of filter layers onto a substrate. This is illustrated in FIG. 33(A). A substrate 160 can be any optical material having high spectral transmittance within the wavelength range of interest to the application, e.g. thermophotovoltaic applications require transparency from wavelength 500 nm to wavelength 2,000 nm. The first layer 161 to be deposited on substrate 160 is a polymer-base layer. Polyimide is an acceptable material. The next layer to be deposited on substrate 160 is the filter metalization 164. Metal 164 could, for example, be gold, aluminum, etc. Once the metalization 164 is deposited, it can then be patterned using the ion beam lithograpy process previously discussed. An E-beam resist layer 166 is spun on top of the metal 164 and a stencil pattern is written into resist layer 166. Resist 166 is then developed, as shown in FIG. 33(B), and the pattern etched into metal 164 via reactive ion etch or plasma etch processes, as shown in FIG. 33(C). The final fabrication step, which is unique to the free-standing filter, is the reactive ion etch of the polymer base layer 161. The key to this operation is the undercutting of the base layer 161 during the etching process. This can be accomplished in polyimide by reactive ion etching polymer 161 in an oxygen plasma at gas pressures of 20–60 millitorr. The higher the pressure, the more undercutting occurs. This process is illustrated in FIG. 33(D). It should be noted that similar results can be achieved using silicon as a base layer and etching the silicon with standard aqueous silicon etchants. With the resultant configuration, silicon pads 161 on a sapphire substrate 160 support a gold film 164. This configuration is almost ideal for a PV cell application since the sapphire is transparent over a spectrum from visible to about 5 microns.

Figure 34:
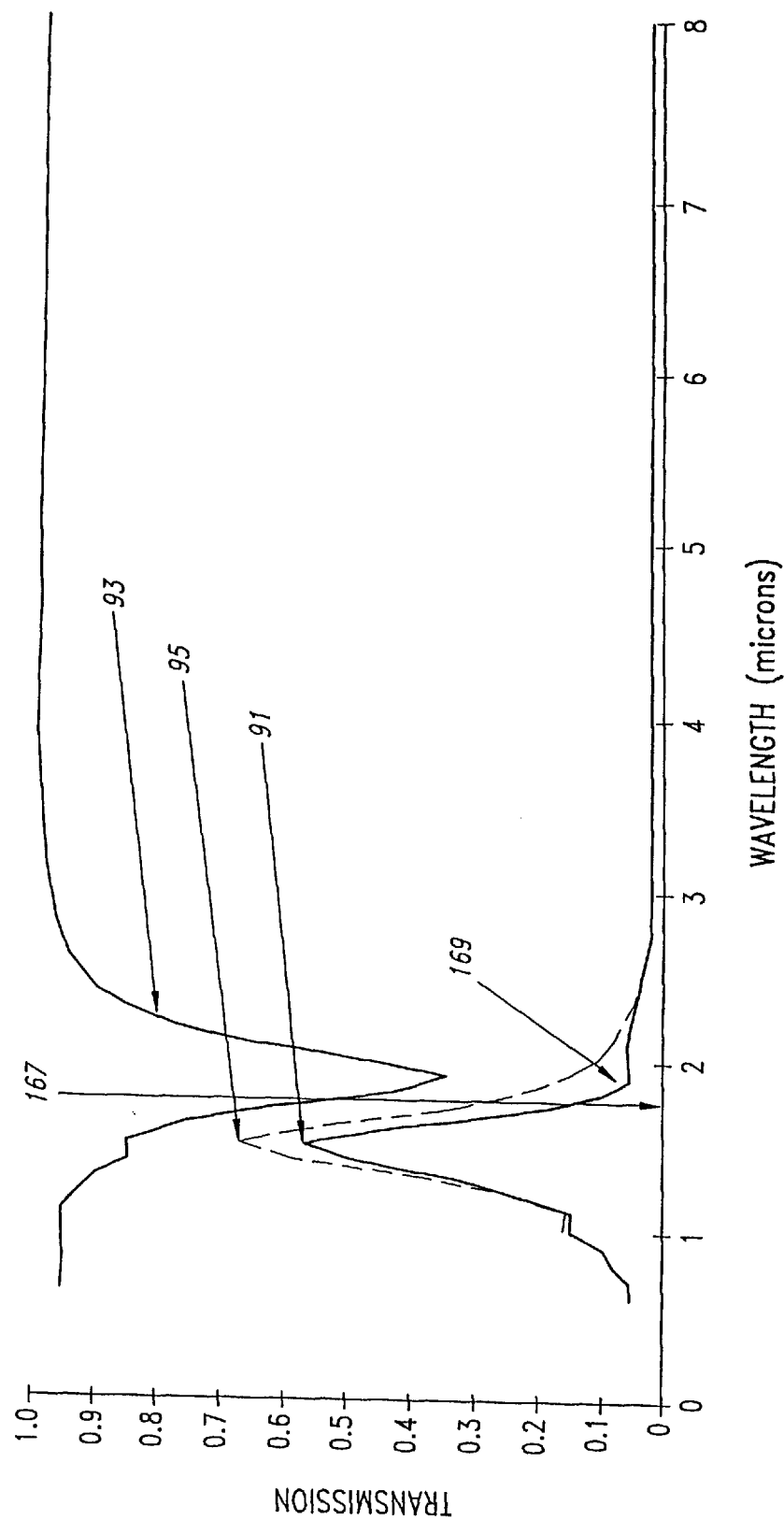
FIG. 34 is a chart like FIG. 13, with the bandgap cutoff wavelength illustrated to show the reduction in out-of-band losses achieved by use of a combination capacitive and inductive resonant micromesh filter and a photovoltaic cell.

FIG. 34 is a reproduction of FIG. 13 with the bandgap cutoff wavelength of a PV cell superimposed on the chart to illustrate reduction in out-of-band losses. A PV cell has a bandgap cutoff wavelength 167 at which longer wavelengths are not absorbed or utilized by the PV cells. Wavelengths shorter than the bandgap cutoff wavelength 167 are converted by the PV cell. With a combination conductive first filter 93 and an inductive second filter 95, the combined transmitted radiant energy 91 having wave lengths greater than the bandgap cutoff wavelength 167 of a PV cell is reduced, thus reducing the out-of-band losses of the PV cell, as depicted by 169. The inband combined transmittance is also reduced, but as shown in the illustration, only by 10%, where out-of-band losses are reduced by over 50%. This substantially increases the conversion efficiency of a filter-PV cell application.

Figure 35:
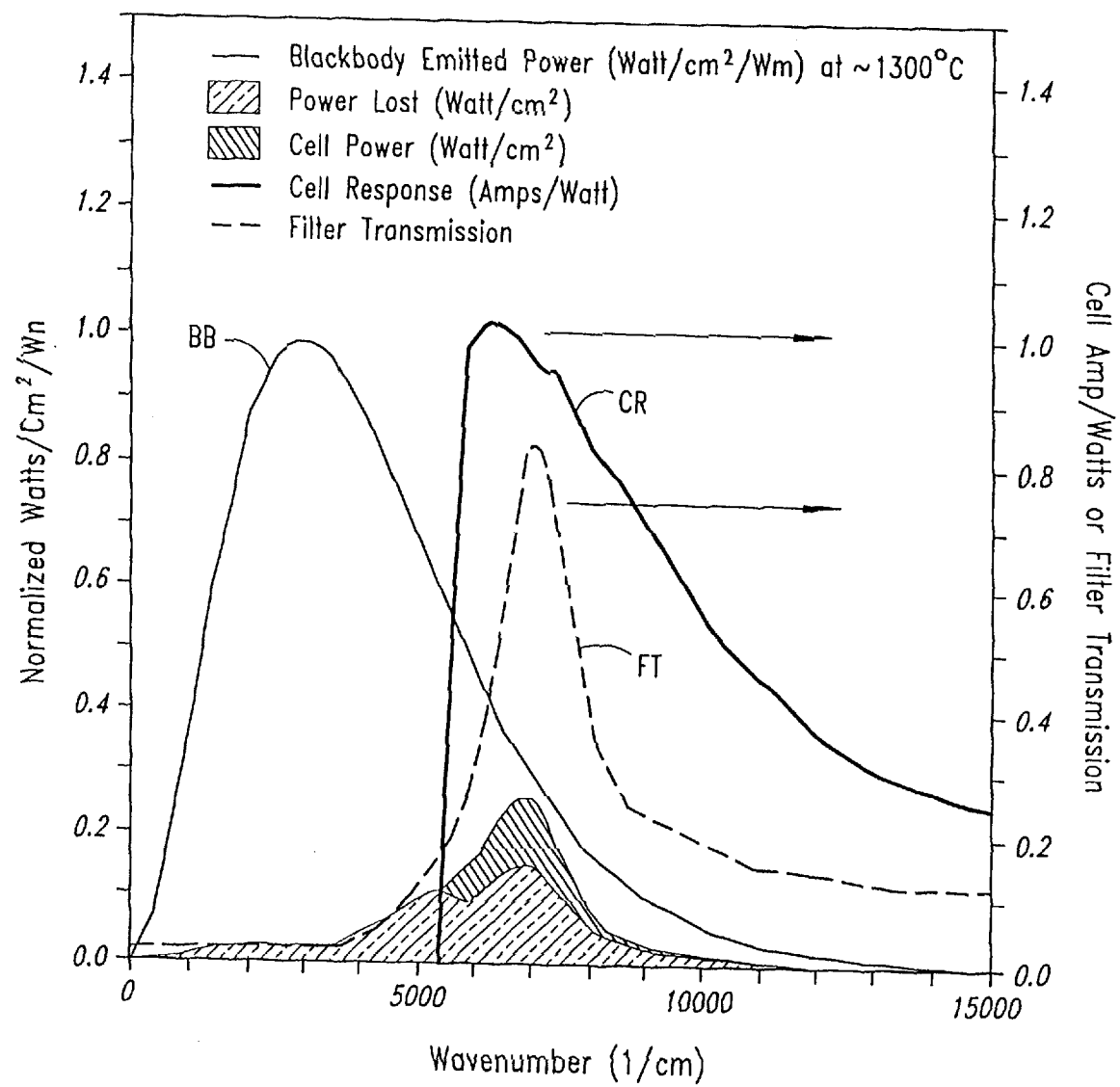
FIG. 35 is a chart illustrating the cell power, or power generated, by a photovoltaic cell receiving radiant energy filtered by a micromesh filter.

FIG. 35 illustrates the spectral response CR of a GaSb PV cell in amps produced per watt of incident photon energy, the transmitted energy spectrum FT from a cross-slot micromesh filter, and energy spectrum BB of a 1200° BB heat source. The power generated by the cell is calculated from the following equation:

$$P_{cell} = Voc \times FF \times \text{cell response } (CR) \times \text{filter transmission } (FT) \times \text{black body emitted energy } (BB)$$

Voc is the open circuit voltage of the GaSb cell, FF is the fill factor for the GaSb cells. The actual thermophotovoltaic efficiency is calculated by the following equation:

$$P_{cell}/(P_{cell}+P_{lost})$$

For the GaSb cell shown, the efficiency of the system is approximately 80%.

Use of a silicon prism concentrator between a filter and photovoltaic (PV) cells increases the efficiency of the system. FIGS. 36–38 illustrate this concept. A silicon prism 170 is mounted between a filter array 172 and a PV cell 174. The prism 170 is made of high index of refraction silicon and works with filter array 172 to concentrate radiant energy onto PV cells 174.

The index of refraction of the silicon prism causes the incident photons to be retracted to a near normal angle of penetration into the prism, as indicated in FIG. 38. The high index of refraction of the silicon prism 170 also serves to deflect by total internal reflection the photons 176 off its sidewalls 178 and direct them down onto the PV cell 174. The large angle incident rays are the hardest to collect onto the cell.

Figure 39:
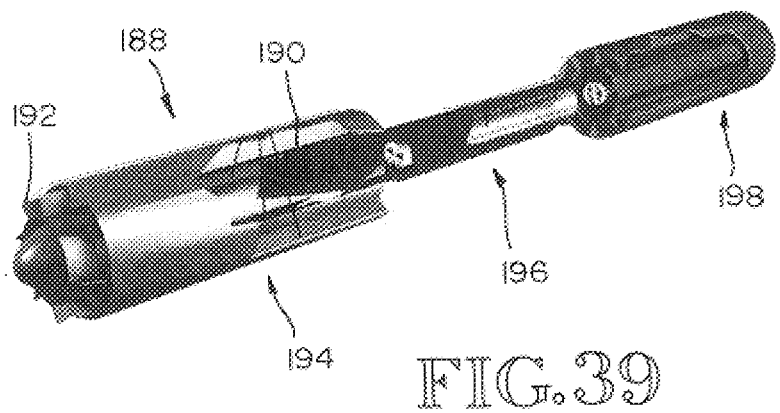
FIG. 39 is a pictorial view of a thermophotovoltaic converter.

FIG. 39 illustrates a gas-fired regenerative thermophotovoltaic (TPV) converter design 188. TPV converter 188 includes a PV cell module 190 that is made up of an array of many individual filter/concentrator/PV cell elements, similar to those shown in FIG. 36. These elements are bonded to an annular alumina substrate (not shown) that also supports interconnect conductor networks for the PV cells. TPV converter 188 also includes a forced intake air fan 192, a burner section 196, and a heat exchanger 198. Burner section 196 forms the thermal energy source for emitting radiant energy to the PV cells. TPV converter 188 is illustrated for a natural gas burner element 196. Burner element 196 is modular in design in that it can be removed from TPV converter 188 and replaced with a different burner element, which alternative burner element can be used with the PV cells and heat exchanger shown.

Figure 40:
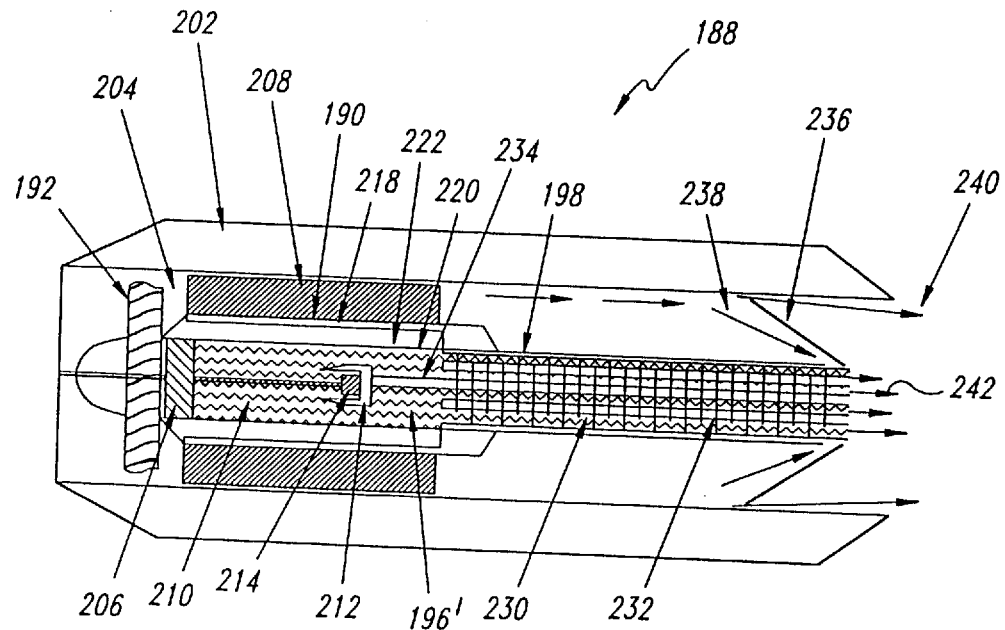
FIG. 40 is a schematic view of the TPV converter of FIG. 39 with an added fuel jacket.

FIG. 40 is a schematic sectional view of TPV converter 188 of FIG. 39, with the natural gas burner element 196 replaced with a fossil fuel burner element 196'. In addition, a fuel jacket 202 has been added. Forced intake air fan 192 is positioned at one end of TPV converter 188. Burner section 196 abuts air fan 192 and creates an annular air duct 204. Thermal insulation 206 is provided between burner element 196 and air fan 192. PV cells 190 are arranged in an annular manner about burner element 196. Cooling fins 208 are mounted to PV cells 190 and function to cool the cells as ambient air is drawn past cooling fins 208 by air fan 192.

Burner element 196 includes a combustion chamber 210, a burner nozzle 212, and a fuel pump 214. Between burner element 196 and PV cells 190 is an annular bandpass filter array 218. An IR emitter 220 lines burner element 196, and a vacuum gap 222 is created between IR emitter 220 and band pass filter 218.

Heat exchanger 198 includes heat exchanger tubes 230, cross flow baffles 232, and a preheated combustion air inlet duct 234. An adjustable air valve 236 directs combustion air 238 preheated by PV cells 190 into heat exchanger 198. Valve 236 allows an exhaust portion 240 of intake air to escape out one end of TPV converter 188. Bypassed airflow 240 combines with exhaust gases 242.

Figure 41:
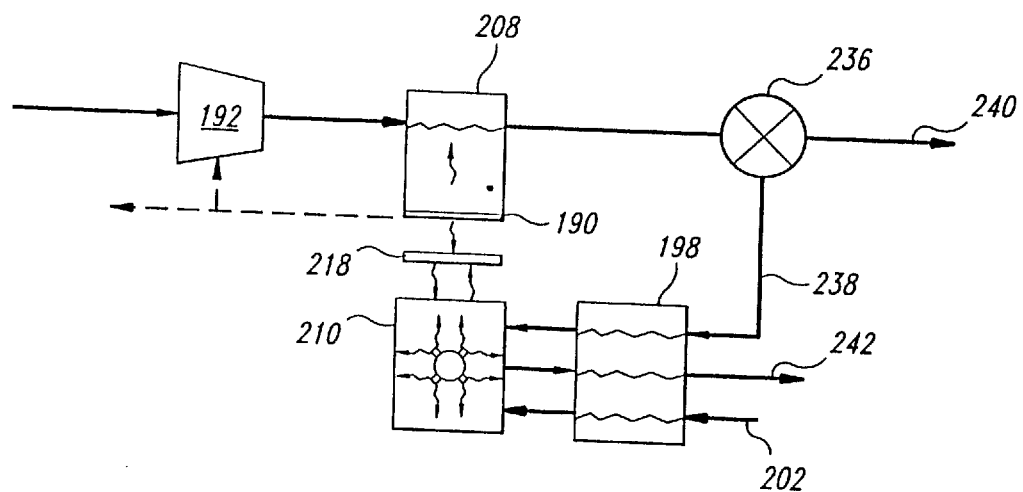
FIG. 41 is a schematic airflow diagram of the TPV converter of FIG. 39.

As schematically illustrated in FIG. 41, the operation of TPV converter 188 is as follows. To provide cooling for PV cells 190 and to promote combustion, air is drawn into the TPV module by an electrically driven fan 192, which forces air through an annular duct. Electricity to run fan 192 is drawn from the PV cell power output. Fan 192 does not need to run with initial combustion ignition and can turn on when the combustion chamber walls approach a target temperature and the cells generate significant electricity. TPV converter housing forms the outer surface of the inlet air duct. The concentric duct inner surface is a tubular alumina mounting plate for the PV cells in the first section. Cooling fins 208 run radially between the cylinder walls of the duct. The inlet air blown over these fins convectively cools the PV cells.

The cooler the PV cell, the better is its efficiency. However, since cooling fan 192 consumes output electricity, the cooling airflow rate is based upon an optimized trade off of these effects. Because both the filter and the PV cells reflect a significant portion of incident energy back to the source, the sum of parasitic losses is an indication of the efficiency of the TPV module. A good approximation is that half of the radiant energy absorbed by the cells is converted into electricity and half into waste heat. In addition, the filter has approximately 2–3% absorption of the incident radiation, which is also a waste heat. A portion of the cell waste heat goes into preheating the inlet air in a regenerative function, which reduces the fuel required to maintain combustion chamber 210 at the desired temperature.

The inlet air continues through the outer inlet duct 204 to the inlet of the primary heat exchanger 198. At this point the airflow is split, and the optimum quantity of combustion reacting air 238 is directed through heat exchanger 198. The remaining air 240 is vented through a variable orifice. The primary heat exchanger is a shell-and-tube counterflow type, with donut and disk baffles. In this type of heat exchanger, the hot exhaust gas flows through the tubes 230, and the inlet air flows through the shell and over the outside of the tubes. The reason for forcing the cooling air across the tubes rather than along the tubes is that a higher heat transfer coefficient can be achieved in crossflow than in flow parallel to the tubes. To achieve crossflow in the shell, baffles 232 are used to force the shell air sequentially through the center hole in donut baffles, then around the edge of disk baffles.

Reactant air is heated to near combustion temperature in the primary heat exchanger before it exits into the combustion chamber 210 where it is mixed with fuel. The fuel feed line 202 is also preheated in primary heat exchanger 198. The thermodynamic advantage of having the reactant air and fuel at near the combustion temperature is that the fuel combustion energy is transferred in a near isothermal reaction, which provides the maximum combustion efficiency. This is because most of the energy required to raise the reactant air to the combustion temperature is provided by exhaust heat, not by fuel energy. This heat exchange effect is known as regeneration. If the heat exchanger had 100% effectiveness, the combustion energy available would be the higher heating value of the fuel, and 100% combustion efficiency would be achieved. Thus, the tradeoff to be optimized is the increased cost associated with more effective heat exchangers versus the fuel cost savings achieved.

In combustion chamber 210, the preheated reactant air is mixed with the fuel uniformly along the axis of the combustion area. This is accomplished by injecting the fuel through an axial diffuser, with the preheated reacting air directly over the diffuser. In steady-state operation, most of the combustion heat is absorbed in the cylindrical ceramic combustion chamber wall, which in turn radiates this energy across a vacuum gap to the PV cells. The vacuum gap between the combustion chamber shell and the cell substrate shell prevents convective heat transfer to the cells, allowing only radiative coupling. The combustion chamber end not facing the heat exchanger or cells is insulated with ceramic foam 206. Heat conducted into the exhaust tubes and carried in the exhaust gases is recovered in regenerating heat exchanger 196. The optimum combustion chamber wall temperature is approximately 1500° K. At this temperature, the peak of the black body emission is at the bandpass of a submicron filter and the bandgap of a GaSb cell. The combustion temperature is a function of fuel burn rate, the preheated reacting air flow rate and temperature, the radiative properties of the cell filter and the chamber wall, and the conductive and convective loss paths out of the chamber. The flow rates of the fuel and reacting air are the adjustable parameters to optimize operation. The loss paths are minimized by the exhaust heat exchanger and the insulation of the combustion chamber. The combustion exhaust gases flow out of the combustion chamber through parallel isolated tubes through the heat exchanger. This design allows easy cleaning and repair of the modular heat exchanger components.

The heat exchanger effectiveness is primarily determined by the gas flow conditions and the surface area coupling the exhaust and air inlet flow streams. A heat exchanger design concept, with fifty one-quarter inch diameter, 12 inch long exhaust tubes, has an effectiveness of 81% and an exhaust heat loss estimated at 360 watts with a design electrical output of 1.7 Kw. This effectiveness could be easily improved by increasing the heat exchanger length, or adding internal fins in the exhaust ducts, or providing a design with greater number of smaller ducts. The economic tradeoff of these features against fuel savings dictates the optimum design. Generally, the exhaust heat loss is not very significant compared to the cell conversion losses.

The overall system efficiency will be determined by the filter performance, cell electrical conversion efficiency, the cavity parasitic losses, and the exhaust heat exchanger effectiveness. The baseline design values of these factors is described below.

a. Radiated power ar 1,500K chamber temperature:
$Q = \epsilon \sigma A(T_4) = (0.97)(5.6E-12)(0.061)(1,500_4) = 17$ Kw b. Filter absorption:
$Q_{parasitic} = (0.03)(17\text{ Kw}) = 0.5$ Kw c. Filter transmittance at energy greater than cell bandgap:
$Q_{trans<bg} = (0.20)(17\text{ Kw}) = 3.4$ Kw d. Cell electric power out:
$Q_{electric\ out} = (hcell)(Q_{trans>bg}) = 0.5(3.4\text{ Kw}) = 1.7$ Kw e. Cell conversion heat:
$Q_{cell\ heat} = (1-hcell)(Q_{trans>bg}) = 0.5(3.4\text{ Kw}) = 1.7$ Kw f. Cell heat due to filter transmittance at energy less than cell bandgap:
$Q_{trans<bg} = (0.006)(17\text{ Kw}) = 0.10$ Kw g. Total cell/filter waste heat:
$Q_{cell/filter\ loss} = Q_{parasitic} + Q_{cell\ heat} + Q_{trans<bg} = (0.5\text{ Kw}) + (1.7\text{ Kw}) + (0.1\text{ Kw}) = 2.3$ Kw h. Heat exchanger exhaust loss:
$Q_{exhaust\ loss} = 0.36$ Kw i. Fan power consumption:
$Q_{fan}$ approximately 10 W (negligible)

Figure 42:
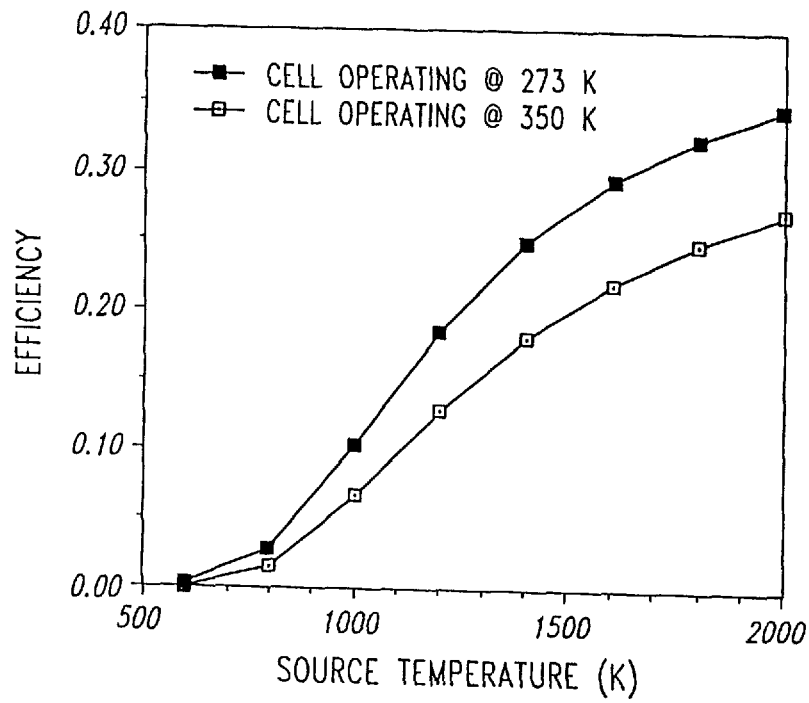
FIG. 42 is a chart illustrating conversion efficiency of a TPV converter with a PV cell operating at 273° K. and a PV cell operating at 350° K.

The overall system efficiency:
$\eta_{overall}$ = electricity out/total heat+electric out := $Q_{electric\ out} / (Q_{electric\ out} + Q_{cell/filter\ loss} + Q_{exhaust\ loss}) = 1.7/(1.7+2.3+0.36)$ $\eta_{overall} = 39\%$ FIG. 42 illustrates an estimated TPV system efficiency versus source emitting temperature at two photovoltaic cell operating temperatures. As can be seen in the chart, the higher the source temperature, the greater the efficiency; and the lower the cell operating temperature, the higher the efficiency.

Figure 43:
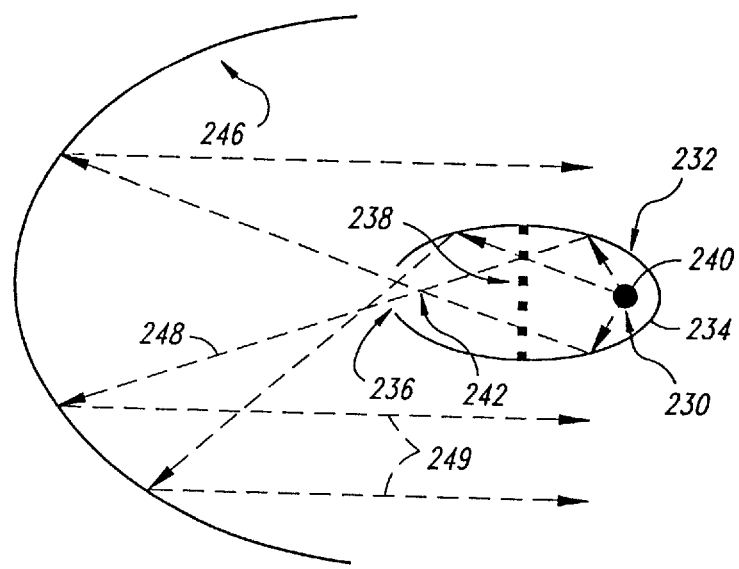
FIG. 43 is a schematic diagram of an IR power beam source for creating a unidirectional, defined bandwidth, radiant energy source.

FIG. 43 illustrates a third application for the micromesh filter of the present invention. In FIG. 43, a beamed electro-optic IR power source 230 is illustrated wherein electrical energy is converted efficiently to a beam of mid-infrared radiant energy. Electrical energy source 230 can be, for example, an electrically heated tungsten emitter. Tungsten emitter 230' is located at the focal point of a reflective elliptical cavity 232.

Elliptical cavity 232 consists of a semi-elliptical cavity with a closed end 234 and an open end 236. A flat micromesh filter 238 is located at the mid point between the two foci 240, 242 of the ellipse. The cavity is optically imaging, and radiated energy is either transmitted by filter 238 or reflected back to emitter absorber 230 with a minimum of two reflections. An optically imaging cavity is needed to allow the micromesh filter to be mounted on a flat plane. This simplifies fabrication and reduces cost of the most technologically sensitive element. The relative surface areas of emitter 230 and cavity 232 are designed to minimize contamination due to emitter absorber evaporation. In actual operation, it has been found that a cavity having silvered walls and a silvered base in the plane between the two foci has been measured to return greater than 85% of the emitted energy back to the emitter absorber. This 85% efficiency included about 10% losses out the window of the cavity which was designed to let in concentrated sunlight. An application with no window could be expected to return approximately 95% of the out-of-band energy to the emitter absorber.

The frequency selective inductively resonant micromesh filter 238 faces tungsten emitter 230. Micromesh filter 238 has the properties of absorbing and re-admitting, or in effect transmitting, photons having energy corresponding to its resonant wavelength, while reflecting those photons whose energy does not resonate with the micromesh filter. The focal point 242 of the elliptical cavity is positioned at the focal point of a parabolic reflector 246. Escaping radiant energy 248 reflects off parabolic reflector 246 to create coherent unidirectional radiant energy 249.

Figure 44:
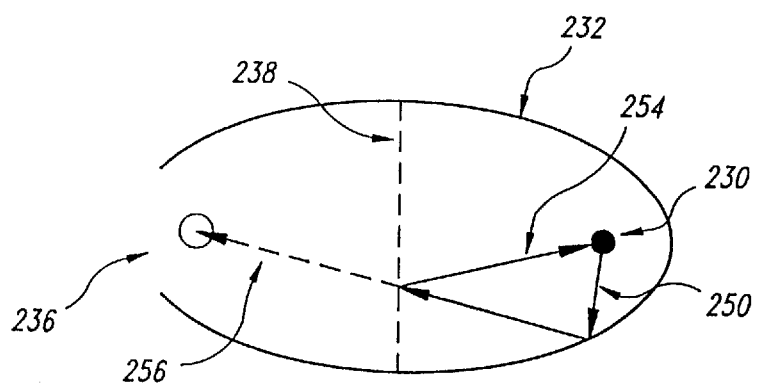
FIG. 44 is an enlarged schematic diagram of the elliptical cavity of the IR power beaming source of FIG. 43.

FIG. 44 illustrates the reflectance and transmittance of a micromesh filter designed for the mid-IR region. As previously discussed, the out-of-band reflection can be as high as 97%. Emitted energy 250 from emitting source 230 reflects off of the reflective inner surface of the elliptical cavity 232 and is directed toward micromesh filter 238 along a path aligned with focal point 242. Out-of-band energy is reflected by filter array 238 back to the source, as indicated at 254. Transmitted in-band energy 256 is directed toward focal point 242 and out through the open end 236 of elliptical cavity 232. Emitted energy from the source that directly strikes the micromesh filter is either reflected thereby or transmitted therethrough. The directly-transmitted energy either reflects off of the inner surface of the elliptical cavity near the open end of the cavity and is redirected back to the filter or directly escapes out the open end of the cavity. The size of the opening dictates the extent to which in-band energy that does not pass through focal point 242 escapes the cavity. Escaping photons strike the parabolic reflector 246 and are redirected. Referring back to FIG. 43, transmitted in-band energy 248 that passes through focal point 242 strikes the parabolic reflector 246 and is redirected along parallel paths back past elliptical cavity 232. This directed beam of energy 248 produces a narrow-band, mid-infrared parallel beam of radiant energy.

Figure 45:
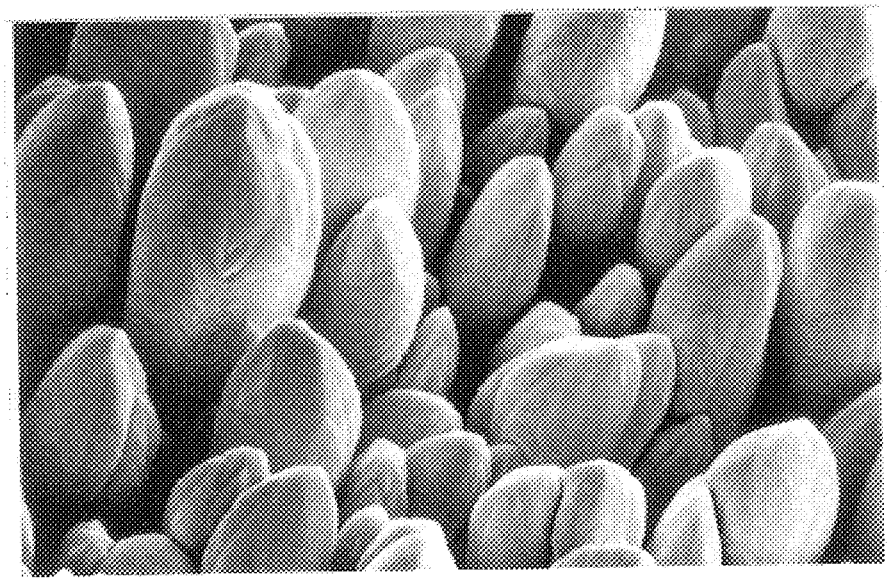
FIG. 45 is a scanning electron microscope photograph of a dendritic tungsten IR emitter.

An additional feature in enhancing the overall efficiency of the elliptical cavity is the ability of the source to reabsorb out-of-band energy returned from the micromesh filter surface, rather than disposing of it as waste energy. This efficiency can be greatly enhanced by altering the emitter surface topology. One effective method in increasing absorbance of returning out-of-band radiation is by introducing dendritic surface features on the exterior surface of the source. Dendritic crystals are formed on the tungsten surface of the source by a process of chemical vapor deposition growth wherein hydrogen-hexafluoride gas is passed over the surface of the tungsten. FIG. 45 is a scanning electron microscope photograph of such a dendritic surface that has been achieved.

The emitter/absorber should efficiently emit radiation in the wavelength band of interest and efficiently reabsorb out-of-band energy reflected back to it by the cavity walls. It must also be capable of operating at high temperatures for sustained periods without itself degrading and without contaminating the reflector walls of the cavity. It has been found that tungsten and graphite are such suitable materials.

Figure 46:
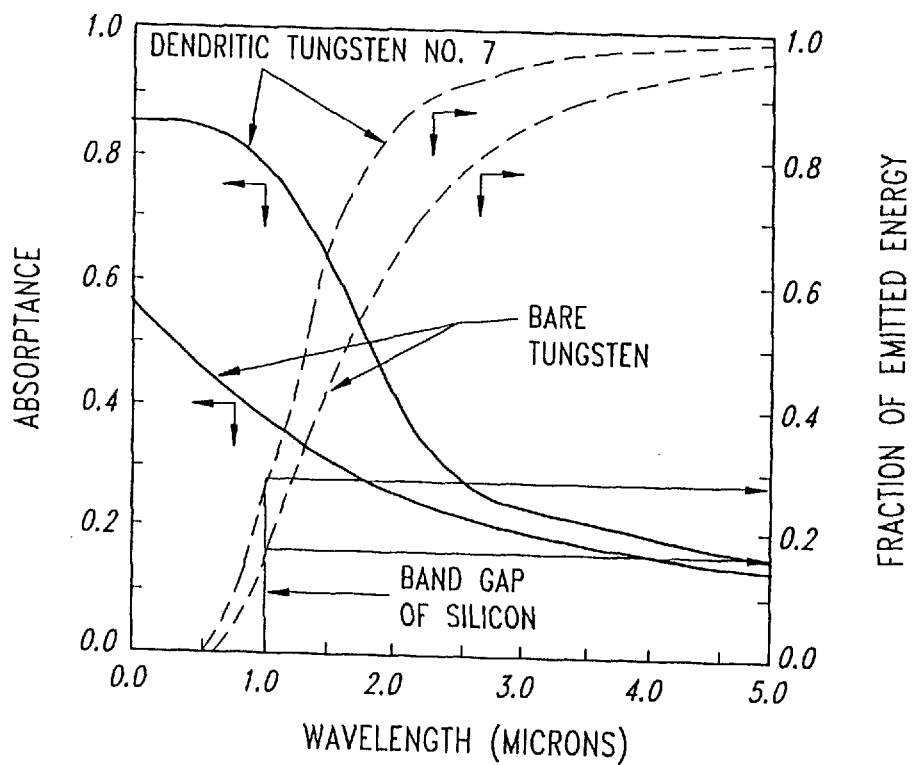
FIG. 46 is a chart illustrating the absorption curve for dendritic crystals on the order of 100 microns tall and 10 microns spacing.

The largest dendritic crystals are on the order of 100 microns tall and ten microns spacing. Such a surface results in the absorption curve shown in FIG. 46. The absorption of bare tungsten is contrasted to that of dendritic tungsten, and it can be seen that dendritic tungsten has a significantly higher absorbance up to approximately 10 microns. The absorption enhancement of tungsten could be extended to the mid-infrared region adjusting growth parameters, such as the size of the crystalline dendritic structure.

Operating life is limited by the length of time the cavity can operate at maximum efficiency. A concern with tungsten is that tungsten emitted from the dendritic surface deposits onto the highly reflective cavity walls and degrades their reflection. To minimize this, it has been attempted to utilize tungsten samples formed as a filament and heated electrically. Cover glasses are mounted at a fixed distance below the tungsten samples. One half of the surface of these cover glasses is coated with vapor deposited silver just as the cavity walls are coated. The glasses can be removed periodically and transmittance and reflectance measurements made to evaluate contamination. A third coated glass is mounted in a position that is shielded from the filaments by two partitions. This third cover glass serves as a control and should be measured along with the exposed glasses to evaluate contamination from sources other than the filament. Applicant conducted a life test in a turbomolecular pumped vacuum chamber at approximately $10^{-7}$ torr vacuum. This test was operated approximately one year, and indicated that for a cavity wall surface area to emitter/absorber surface area ratio of 400 to 1, a lifetime in excess of ten years could be expected at 2000° C. emitter operating temperature.

The elliptical cavity produces a thermal source of mid-infrared radiant energy that is confined to a relatively narrow spectral bandwidth, is adjustable to desired wavelengths by controlling physical dimensions, and can be spatially directed with appropriate optics. This application of the micromesh filter couples the resonant micromesh absorbing/emitting surface with a reflecting cavity to confine the energy emitted from a radiant heat source to a narrow band of wavelength. The resonant micromesh filter and the reflective cavity effectively reduce parasitic losses that are commonly incurred in other thermal configurations that depend on reflector or oxide emitters for their operation.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. A method of fabricating a resonant micromesh filter having conductive antenna elements sized on the order of microns, comprising the steps of:

(1) creating an exposure mask having absorbing portions capable of stopping incident ions completely and transmitting portions incapable of stopping incident ions and through which incident ions can pass, the absorbing and transmitting portions formed in the mask in the pattern of the antenna elements to be fabricated, (2) positioning the exposure mask confronting an unpatterned filter, the unpatterned filter including a substrate, a thin metal foil mounted on the substrate, and a resist material covering the metal foil, (3) passing ions through the exposure mask wherein the absorbing portions of the mask stop the ions and the transmitting portions allow ions to pass through the mask and expose a section of the resist material of the filter in the pattern of the antenna elements, (4) repositioning the exposure mask over an area of the unpatterned filter not previously exposed to incident ions and repeating step (3)

(5) repeating step (4) until a desired surface area of the unpatterned filter has been exposed, and (6) processing the exposed unpatterned filter to produce a conductive antenna array supported by a substrate.

2. The method of claim 1, wherein the step of creating the exposure mask includes creating a master pattern in a stencil membrane covered with a layer of resist material by a process of E-beam lithography wherein electrons are passed between deflection plates and directed onto the stencil membrane and resist material, and applying reactive ion etch solutions to the resist and stencil membrane to create an antenna array pattern in the membrane.

3. The method of claim 2, wherein the step of creating the exposure mask includes covering the stencil membrane with an unpatterned metal absorber prior to applying the resist material, and the step of applying reactive ion etch solutions is used only to remove exposed metal from the mask, leaving the membrane intact, and to remove the resist material from the metal.

4. The method of claim 3, wherein the membrane is made of silicon, and the step of passing ions through the exposure mask includes aligning the ion beam with the silicon crystal axis, to enhance ion transmission through the silicon membrane.

5. The method of claim 1, wherein the resist material is polymethylmethacrylate.

6. The method of claim 1, wherein the resist material is polystyrene.

7. The method of claim 1, wherein the step of creating the exposure mask includes implanting a layer of boron ions into a silicon wafer, applying a reactive ion etch to the non-boron ion doped silicon to remove the non-doped silicon from the layer of boron-doped silicon to create a thin silicone membrane, and applying a resist material over the silicon membrane.

8. The method of claim 1, wherein the step of processing the exposed unpatterned filter includes the steps of developing the resist material, applying a reactive ion etch to strip away portions of the metal foil, and applying a second reactive ion etch to strip away the remaining resist material.

* * * * *